US008775601B2

United States Patent
O'Sullivan et al.

(10) Patent No.: US 8,775,601 B2
(45) Date of Patent: *Jul. 8, 2014

(54) MANAGING ORGANIZATIONAL COMPUTING RESOURCES IN ACCORDANCE WITH COMPUTING ENVIRONMENT ENTITLEMENT CONTRACTS

(71) Applicant: International Business Machines Corporation, Armonk, NY (US)

(72) Inventors: Patrick J. O'Sullivan, Dublin (IE); James C. Thorburn, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,837

(22) Filed: Feb. 8, 2013

(65) Prior Publication Data

US 2013/0151712 A1     Jun. 13, 2013

Related U.S. Application Data

(63) Continuation of application No. 13/171,515, filed on Jun. 29, 2011.

(51) Int. Cl.
*G06F 15/173* (2006.01)
*G06Q 10/00* (2012.01)
*H04L 29/08* (2006.01)

(52) U.S. Cl.
CPC .......... *H04L 29/08468* (2013.01); *G06Q 10/00* (2013.01)
USPC ........... 709/223; 709/203; 709/224; 709/225; 709/226

(58) Field of Classification Search
CPC .................. G06F 9/505; G06F 9/5061; G06F 2221/2115; G06F 9/5072; H04L 67/1002; H04L 67/1029
USPC ......................................... 709/203, 223–226
See application file for complete search history.

(56) References Cited

U.S. PATENT DOCUMENTS 5,745,880 A   4/1998   Strothmann
6,968,324 B1   11/2005   Ruffin et al.
(Continued)

FOREIGN PATENT DOCUMENTS

JP   2004-145610 A   5/2004
JP   2006-260253 A   9/2006
(Continued)

OTHER PUBLICATIONS

Interview Summary mailed May 2, 2013 for U.S. Appl. No. 13/677,394, 4 pages.
(Continued)

*Primary Examiner* — Wing F Chan
*Assistant Examiner* — Benjamin M Thieu
(74) *Attorney, Agent, or Firm* — Stephen J. Walder, Jr.; Yeen C. Tham

(57) ABSTRACT

Mechanisms for reserving computing resources of a data processing system are provided. These mechanisms generate one or more computing environment entitlement contract (CEEC) data structures, each CEEC data structure defining terms of a business level agreement between a contracting party and a provider of the data processing system. These mechanisms associate a set of computing resources with a CEEC data structure. The mechanisms then manage the set of one or more computing resources in accordance with the associated CEEC. Such management includes, in response to a contracting party failing to utilize the computing resources in the selected computing resource cohort for a specified purpose at approximately a specified level and pattern of intensity during approximately a specified period of time, all of which are identified in the CEEC data structure, then the CEEC data structure is invalidated or nullified.

12 Claims, 14 Drawing Sheets

(56) References Cited

U.S. PATENT DOCUMENTS

| | | | |
|---|---|---|---|
| 7,203,864 B2 | 4/2007 | Goin et al. | |
| 7,243,145 B1 | 7/2007 | Poortman | |
| 7,310,592 B2 | 12/2007 | Crittenden et al. | |
| 7,313,795 B2 | 12/2007 | Chew et al. | |
| 7,334,032 B2* | 2/2008 | Chambliss et al. | 709/224 |
| 7,380,177 B2 | 5/2008 | Goin et al. | |
| 7,447,681 B2 | 11/2008 | Lightstone et al. | |
| 7,616,583 B1 | 11/2009 | Power et al. | |
| 7,702,779 B1 | 4/2010 | Gupta et al. | |
| 7,747,449 B2 | 6/2010 | Lober et al. | |
| 7,769,843 B2 | 8/2010 | Neuse et al. | |
| 7,813,993 B1 | 10/2010 | Barto et al. | |
| 7,856,549 B2 | 12/2010 | Wheeler | |
| 8,032,875 B2 | 10/2011 | Kosche et al. | |
| 2002/0059427 A1 | 5/2002 | Tamaki et al. | |
| 2003/0110250 A1 | 6/2003 | Schnitzer et al. | |
| 2004/0037230 A1 | 2/2004 | Kroboth et al. | |
| 2004/0098154 A1 | 5/2004 | McCarthy | |
| 2004/0194055 A1 | 9/2004 | Galloway et al. | |
| 2005/0027863 A1 | 2/2005 | Talwar et al. | |
| 2005/0038834 A1 | 2/2005 | Souder et al. | |
| 2005/0138162 A1 | 6/2005 | Byrnes | |
| 2005/0204054 A1* | 9/2005 | Wang et al. | 709/232 |
| 2005/0222885 A1 | 10/2005 | Chen et al. | |
| 2006/0034438 A1 | 2/2006 | O'Neill | |
| 2006/0036518 A1 | 2/2006 | O'Neill | |
| 2006/0085836 A1 | 4/2006 | Lyons et al. | |
| 2006/0149652 A1 | 7/2006 | Fellenstein et al. | |
| 2006/0206929 A1 | 9/2006 | Taniguchi et al. | |
| 2006/0224436 A1 | 10/2006 | Matsumoto et al. | |
| 2006/0277206 A1 | 12/2006 | Bailey et al. | |
| 2007/0133428 A1 | 6/2007 | Taylor et al. | |
| 2007/0185990 A1 | 8/2007 | Ono et al. | |
| 2008/0080552 A1 | 4/2008 | Gates et al. | |
| 2009/0007126 A1 | 1/2009 | Jelinek et al. | |
| 2009/0089072 A1 | 4/2009 | Gupta et al. | |
| 2009/0113079 A1 | 4/2009 | Eren et al. | |
| 2009/0240547 A1 | 9/2009 | Fellenstein et al. | |
| 2009/0248869 A1 | 10/2009 | Ghostine | |
| 2009/0259511 A1 | 10/2009 | Fellenstein et al. | |
| 2009/0265450 A1 | 10/2009 | Helmer et al. | |
| 2009/0287825 A1 | 11/2009 | Walker et al. | |
| 2010/0023918 A1* | 1/2010 | Bernardini et al. | 717/101 |
| 2010/0036698 A1 | 2/2010 | Garrison et al. | |
| 2010/0058350 A1 | 3/2010 | Boss et al. | |
| 2010/0131624 A1 | 5/2010 | Ferris | |
| 2010/0169893 A1 | 7/2010 | Collins et al. | |
| 2010/0180275 A1 | 7/2010 | Neogi et al. | |
| 2010/0250642 A1 | 9/2010 | Yellin et al. | |
| 2010/0287560 A1 | 11/2010 | Neft | |
| 2010/0332262 A1 | 12/2010 | Horvitz et al. | |
| 2011/0004574 A1 | 1/2011 | Jeong et al. | |
| 2011/0004885 A1 | 1/2011 | Kikuchi et al. | |
| 2011/0016214 A1 | 1/2011 | Jackson | |
| 2011/0029651 A1 | 2/2011 | Snyder et al. | |
| 2011/0055398 A1 | 3/2011 | Dehaan et al. | |
| 2011/0055605 A1 | 3/2011 | Jackson | |
| 2011/0106712 A1 | 5/2011 | Calsyn et al. | |
| 2013/0006648 A1 | 1/2013 | O'Sullivan et al. | |
| 2013/0006680 A1 | 1/2013 | O'Sullivan et al. | |
| 2013/0006686 A1 | 1/2013 | O'Sullivan et al. | |
| 2013/0006793 A1 | 1/2013 | O'Sullivan et al. | |
| 2013/0007760 A1 | 1/2013 | O'Sullivan et al. | |
| 2013/0007761 A1 | 1/2013 | O'Sullivan et al. | |
| 2013/0144676 A1 | 6/2013 | O'Sullivan et al. | |

FOREIGN PATENT DOCUMENTS

| | | |
|---|---|---|
| JP | 2007-323439 A | 12/2007 |
| JP | 2010-250778 A | 11/2010 |

OTHER PUBLICATIONS

Office Action mailed May 22, 2013 for U.S. Appl. No. 13/171,574; 15 pages.
Office Action mailed Jun. 11, 2013 for U.S. Appl. No. 13/171,558; 28 pages.
Response to Office Action filed with the USPTO on Apr. 25, 2013 for U.S. Appl. No. 13/171,529, 25 pages.
Response to Office Action filed with the USPTO on Apr. 25, 2013 for U.S. Appl. No. 13/677,394, 21 pages.
International Search Report and Written Opinion dated Aug. 28, 2012, International Application No. PCT/IB2012/052908, 8 pages.
U.S. Appl. No. 13/171,515.
U.S. Appl. No. 13/171,529.
U.S. Appl. No. 13/171,537.
U.S. Appl. No. 13/171,558.
U.S. Appl. No. 13/171,574.
U.S. Appl. No. 13/171,592.
U.S. Appl. No. 13/677,394.
"Cloud billing: The missing link for cloud providers", White Paper, CGI Group Inc., 2010, 11 pages.
Branco, K. et al., "PIV and WPIV: Two New Performance Indices for Heterogeneous Systems Evaluation", Proc. of the IEEE International Symposium on Industrial Electronics, Montreal, Canada [s. n.], 2006, IEEE, 10 pages.
Nallanchakravarthula, Sriramkumar, "Trading System Design and Implementation in Ocean (Open Computation Exchange and Arbitration Network)", University of Florida Digital Collections, Thesis, 2002, 60 pages.
Wang, Tengjiao et al., "MBA: A Market-based Approach to Data Allocation and Dynamic Migration for Cloud Database", Science China, Jan. 2010 vol. 53 No. 1, pp. 1-18.
U.S. Appl. No. 13/736,920.
Final Office Action mailed Jul. 22, 2013 for U.S. Appl. No. 13/171,529; 19 pages.
Final Office Action mailed Jul. 22, 2013 for U.S. Appl. No. 13/677,394; 18 pages.
Office Action dated Aug. 1, 2013 for U.S. Appl. No. 13/171,515; 28 pages.
Response to Office Action filed Aug. 20, 2013, U.S. Appl. No. 13/171,574, 28 pages.
Response to Office Action filed with the USPTO Sep. 9, 2013 for U.S. Appl. No. 13/171,558; 27 pages.
Emilio, Vanessa, "Service Agreement: What Services Can Be Included in a Service Level Agreement?", Apr. 7, 2011, Retrieved on Jul. 12, 2013 from: http://ezinearticles.com/search/?q=&expert=Vanessa+Emilio&index=25, 1 page.
Nimsoft, "Unified Monitoring Portal Online Help", Dec. 11, 2010, Retrieved on Jul. 17, 2013 from: http://docs.nimsoft.com/prodhelp/UMP/2.0/pdf/slm.pdf, 123 pages.
Appeal Brief filed with the USPTO on Dec. 9, 2013 for U.S. Appl. No. 13/171,529, 31 pages.
Appeal Brief filed with the USPTO on Dec. 9, 2013 for U.S. Appl. No. 13/677,394, 25 pages.
Final Office Action dated Nov. 7, 2013 for U.S. Appl. No. 13/171,558; 44 pages.
Final Office Action mailed Dec. 4, 2013 for U.S. Appl. No. 13/171,574, 19 pages.
Interview Summary dated Nov. 4, 2013 for U.S. Appl. No. 13/171,515; 3 pages.
Response to Office Action filed Nov. 1, 2013 for U.S. Appl. No. 13/171,515; 26 pages.
Appeal Brief filed May 5, 2014, U.S. Appl. No. 13/171,575, 39 pages.
Appeal Brief filed with the USPTO on Apr. 4, 2014 for U.S. Appl. No. 13/171,558, 49 pages.
Examiner's Answer mailed Apr. 23, 2014 for U.S. Appl. No. 13/171,558; 28 pages.
Notice of Allowance mailed Feb. 18, 2014 for U.S. Appl. No. 13/171,515; 18 pages.
Notice of Allowance mailed Apr. 10, 2014 for U.S. Appl. No. 13/171,529; 24 pages.
Notice of Allowance mailed Apr. 15, 2014 for U.S. Appl. No. 13/677,394; 22 pages.

* cited by examiner

| SAVINGS OBJECTIVES | UNITS |
|---|---|
| POWER CONSUMPTION | WATTS |
| SQUARE FOOTAGE | RACK UNITS CONVERTED TO SQ. FT. |
| DEPRECIATION | DEPRECIATION |

1110

| SELL SIDE FILTERS | |
|---|---|
| SPECIFIED USE TO PRODUCE SPECIFIED BUSINESS OUTPUTS | DESCRIPTIVE PHASE FROM A REFERENCE LIST |
| PATTERN OF INTENSITY OF UTILIZATION | DEFINED PATTERN |
| OS NAME | LIST SW OS NAMES |
| OS PLATFORM | LIST SW PLATFORMS |
| HARDWARE CLASS | HW CLASSES |
| CPU ARCHITECTURE | LIST HW CPU ARCHITECTURES |
| CPU NAME | HW CPU SPECS |
| BUILDING | BUILDINGS |
| CLUSTER | SW CLUSTER |
| HR ORG | PEOPLE HR ORGS |
| BUSINESS UNIT | PEOPLE HR ORGS |
| PHYSICAL CONFIG. | LIST HW PHYSICAL CONFIGS. |
| EFFICIENCY GRADE | STATIC LIST |
| CAPT DT | DATE |
| TARGET POWER CONSUMP. | WATTS |
| TARGET RACK UNITS | RACK UNITS |
| TARGET NBV AMOUNT | USD |
| TARGET OS QTY | NUMBER |
| TARGET HW QTY | NUMBER |

| SELL SIDE COSTS | |
|---|---|
| CPU | MHZ |
| RAM | MB |
| NETWORK IO | |
| DISK IO | |
| STORAGE | GB |
| POWER | WATTS |
| COOLING | BTU |
| SQUARE FOOTAGE | SQ. FT. |
| LICENSING | $ |
| ADMIN SUPPORT | PERSON YEARS |
| IT SECURITY | PERSON YEARS |

1130

| BUY SIDE FILTERS | |
|---|---|
| SPECIFIED USE TO PRODUCE SPECIFIED BUSINESS OUTPUTS | DESCRIPTIVE PHASE FROM A REFERENCE LIST |
| PATTERN OF INTENSITY OF UTILIZATION | DEFINED PATTERN |
| OS NAME | LIST SW OS NAMES |
| OS PLATFORM | LIST SW PLATFORMS |
| HARDWARE CLASS | HW CLASSES |
| CPU ARCHITECTURE | LIST HW CPU ARCHITECTURES |
| CPU NAME | HW CPU SPECS |
| BUILDING | BUILDINGS |
| CLUSTER | SW CLUSTER |
| HR ORG | PEOPLE HR ORGS |
| BUSINESS UNIT | PEOPLE HR ORGS |
| PHYSICAL CONFIG. | LIST HW PHYSICAL CONFIGS. |
| EFFICIENCY GRADE | STATIC LIST |
| CAPT DT | DATE |
| TARGET POWER CONSUMP. | WATTS |
| TARGET RACK UNITS | RACK UNITS |
| TARGET NBV AMOUNT | USD |
| TARGET OS QTY | NUMBER |
| TARGET HW QTY | NUMBER |

| 1100 | FIG. 11A |
|---|---|
| | FIG. 11B |
| | FIG. 11C |

| BUY SIDE COSTS | |
|---|---|
| CPU | MHZ |
| RAM | MB |
| NETWORK IO | |
| DISK IO | |
| STORAGE | GB |
| POWER | WATTS |
| COOLING | BTU |
| SQUARE FOOTAGE | SQ. FT. |
| LICENSING | $ |
| ADMIN SUPPORT | PERSON YEARS |
| IT SECURITY | PERSON YEARS |

MANAGING ORGANIZATIONAL COMPUTING RESOURCES IN ACCORDANCE WITH COMPUTING ENVIRONMENT ENTITLEMENT CONTRACTS

This application is a continuation of application Ser. No. 13/171,515, filed Jun. 29, 2011, status pending.

BACKGROUND

The present application relates generally to an improved data processing apparatus and method and more specifically to mechanisms for managing the computing resources of an organization in accordance with established computing environment entitlement contracts.

Investments in computing resources represent a significant overhead for large organizations in today's society. Large organizations, such as the United States federal government, individual departments and agencies of governments, businesses such as International Business Machines Corporation of Armonk, N.Y., Bank of America, General Electric, Citigroup, and many others, may have thousands of computers of various types, configurations, capabilities, and levels of efficiency. It is an arduous task to manage all of these computing resources so that these organizations make efficient and optimum use of these computing resources. Efficient and optimum use of these computing resources includes the identification of non-utilized, under-utilized, or simply obsolete technology for decommission and replacement.

One major hurdle to optimizing computing resources of an organization is the reluctance of organization personnel to change. That is, when personnel are issued computing resources, e.g., a laptop, desktop computer, etc., they view that computing resources as being completely dedicated to them, i.e. the employee has 100% entitlement to the computing resources regardless of whether the employee actually uses those computing resources or not. This gives the employee a sense of confidence that if the employee ever needs the computing resources, they will be available since the employee has 100% entitlement to these computing resources. As a result, the employee is reluctant to give up those computing resources for other computing resources where the employee perceives that they are given less than 100% entitlement to the computing resources, such as in a shared computing resource environment, e.g., a virtualized computing environment or the like. That is, even though the employee may not be utilizing, or at least fully utilizing, the computing resources, the employee does not give up those computing resources because they would rather keep the guarantee that the computing resources will be available to them, no matter how inefficient or obsolete these computing resources may be, rather than take the risk that new computing resources may not be available when they need them.

Furthermore, known mechanisms allocate computing resources to employees but then do not have any mechanism determining whether the employee is using those computing resources to achieve the business purpose for which the employee was given those computing resources. Thus, often times, a computing resource may be allocated to an employee and that employee may use the computing resources, but not to achieve the business purposes for which the computing resources were intended and may in fact be using the computing resources for another purpose. Thus, while it may appear that the computing resources are being utilized, they are not in fact being used to benefit the organization. There is no known mechanism for detecting such situations and then handling to optimize the benefit of computing resource allocation to the organization.

Mechanisms are needed for incentivizing employees to relinquish non-utilized, under-utilized, or obsolete computing resources for new computing resources in such a way as to give them a sense of confidence that their needs will be met with the new computing resources. Moreover, mechanisms are needed for detecting situations where computing resources are not being used to achieve the business purposes for which they were allocated and then handling these situations so as to optimize the allocation of computing resources to the benefit of the organization as a whole.

Additionally, there is weak support currently for defining a "use" of a computing resource beyond the execution of an atomic workload. The "use" of a computing resource, as its user conceives it, is generally on a timescale of months, not seconds, encapsulating any number of different interleaved workloads, and including expected periods of non-use, which may be of multiple days of duration. Thus the optimization of an environment in which "use" is so defined is much more involved than simply finding an execution environment for atomic workloads.

SUMMARY

In one illustrative embodiment, a method, in a data processing system comprising at least one computing device and a plurality of computing resources, for reserving computing resources of a data processing system. The method comprises establishing, by the at least one computing device, one or more computing environment entitlement contract (CEEC) data structures, each CEEC data structure defining terms of a business level agreement between a contracting party and a provider of the data processing system. The terms of the CEEC specify a set of computing resources having a specified configuration that are to be used by the contracting party for a specified purpose at a specified level and pattern of intensity for a specified period of time.

The method further comprises associating, by the at least one computing device, a set of one or more computing resources with a CEEC data structure. Moreover, the method comprises managing, by the at least one computing device, the set of one or more computing resources in accordance with the associated CEEC data structure. In response to the contracting party failing to utilize the computing resources in the selected computing resource cohort for the specified purpose at approximately the specified level and pattern of intensity during approximately the specified period of time, then logic of the data processing system nullifies the CEEC data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and one or more memories coupled to the one or more processors. The one or more memories may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 11A-11C depict an example diagram of a transaction specification in accordance with one illustrative embodiment.

DETAILED DESCRIPTION

Figure 1:
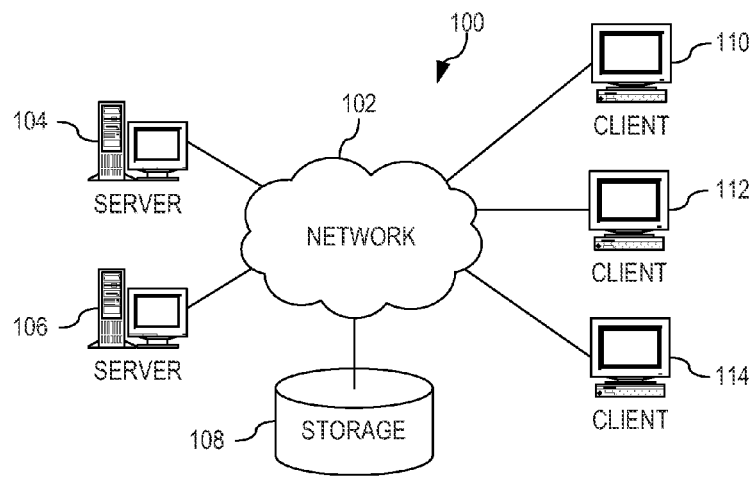
FIG. 1 is an example diagram of a distributed data processing system in which aspects of the illustrative embodiments may be implemented.

The illustrative embodiments provide a mechanism for managing the computing resources of an organization in accordance with established computing environment entitlement contracts (CEECs). With the mechanisms of the illustrative embodiments, CEECs are established for each pairing of a contracting party with one or more computing resources of an organization, typically a large scale organization having hundreds or even thousands of computing resources of various types, configurations, capabilities, uses, and the like. The CEECs are used as a basis for pairing contracting parties with appropriate computing resources, evaluating a contracting party's utilization of the computing resources with which the contracting party is associated, re-allocating contracting parties to appropriate computing resources dynamically, matching buyers and sellers of CEECs in a market maker environment, and performing other computing resource management operations as described hereafter. As a result of the management of computing resources based on these CEECs workloads may be balanced, migrated, managed, and the like, to optimize the utilization of the computing resources of the organization. However, this workload management, balancing, migration and the like is a consequence of the management of the computing resources based on these CEECs, and is not the primary mechanism for achieving efficiency. That is, the subject of optimization is the totality of a managed computing environment, of which any given workload execution is a small part, which in and of itself does not define the CEEC.

The CEEC is an explicit agreement that a given contracting party, e.g., a person, group, department, division, company, or the like, will use a given set of one or more computing resources (e.g., hardware and/or software resources), configured in a given way (thus defining a computing environment) for a given business purpose, at a given level and pattern of intensity of utilization, for a given period of time. The given level may be represented, for example, as minimum, maximum, average, or other representation of an amount of utilization. The pattern of intensity of utilization may be defined in terms of a plurality of given levels of utilization at one or more specified intervals over the given period of time. The CEEC may further define migration criteria limiting migrating capabilities for migrating the CEEC from one set of computing resources to another. Each CEEC may be defined in one or more data structures that are accessible by one or more hardware and/or software mechanisms of the illustrative embodiments to achieve the computing resource management operations set forth hereafter.

A data processing system in accordance with the illustrative embodiments comprises logic for enforcing the CEEC on both the data processing system and the identified contracting party such that the set of computing resources, or a portion of the set of computing resources, specified in the CEEC is reserved for use by the identified contracting party whether or not the identified contracting party is actually using the set of computing resources for the specified business purpose, and the CEEC is invalidated if the contracting party fails to use the set of computing resources for the specified business purpose within the terms of the CEEC. That is, the CEEC is enforceable on the computing resources provider side regardless of whether the contracting party actually utilizes the computing resources under the CEEC or not. However, at the same time, if the contracting party fails to utilize the computing resources subject to the CEEC in accordance with the terms of the CEEC, then the CEEC may be nullified or negated by the data processing system such that it is not enforceable on either the computing resources provider or the contracting party. Typically, such negation is coupled with replacement of the CEEC with a new CEEC that is more appropriate to the contracting party's usage of computing resources with the new CEEC possibly being associated with a new set or one or more computing resources which may be different from the previous set of one or more computing resources associated with the now negated CEEC. The authority for the negation of a CEEC is provided by the enterprise/organization that ultimately owns the computing resources and benefits from their use and which has adopted the mechanisms of one or more of the illustrative embodiments of the present invention.

The CEEC also provides a mechanism through which valuation and trading of entitlements to computing resources may be executed in a market maker mechanism. This market maker mechanism establishes a market for exchanging CEECs, and thus, their associated workloads and capacities, however this is not a "free market." It is a market that is owned by the particular organization and is managed so as to serve the specific interests of the particular organization. That is, rather than simply determining a highest bidder as in a free market system, the CEEC market maker of the illustrative embodiments may allow the particular organization to define the preferences for matching buyers and sellers of CEECs within the established market. Thus, market forces are harnessed by the particular enterprise/organization to ensure that its values are reinforced and realized by the trading performed via the market.

A simple example of a CEEC and its usage in a CEEC based computing resource management system is a company, e.g., International Business Machines (IBM) Corporation of Armonk, N.Y., providing an employee with a laptop computer. In this scenario, the computing resource may be considered to be the laptop computer and the contracting party may be considered to be the employee while the provider of the computing resource is the company, i.e. IBM Corporation. In allocating the laptop to the employee, a CEEC is established to govern both the provider's requirement to provide the laptop to the employee, i.e. the employee's entitlement to the computing resource, and the employee's requirement to utilize the laptop for a specified business purpose (e.g., software development), configured in a given way (e.g., having a particular set of hardware and/or software for achieving the specified business purpose, at a given level and pattern of intensity of utilization (e.g., utilization of the laptop resources at approximately 50% utilization during the work hours of 9 am to 5 pm, Monday through Friday, for a given period of time, e.g., 1 year. The system may then monitor the employee's utilization of the laptop in accordance with the CEEC and control the transfer of CEECs between buyers and sellers, the negation of the CEEC and creation of a new CEEC for the employee, and/or the like based on the terms specified in the CEEC.

For example, the data processing system of the illustrative embodiments may monitor the employee's usage of the laptop by determining how often the employee utilizes the laptop, what processes are executed when the employee is utilizing the laptop, how much of the laptop's resources are utilized when the employee is using the laptop, and any other metrics that are indicative of the employee's utilization of the computing resource (laptop) under the CEEC. From this monitoring, it can be determined whether the employee is utilizing the laptop within a given tolerance of the terms specified in the CEEC and if not, whether the discrepancy between the actual utilization of the laptop by the employee and the expected utilization under the CEEC warrants an exchange of the CEEC, a negation of the CEEC and creation of a new CEEC, or other management operation. The exchange, negation, creation, or other management operation associated with a CEEC may further result in the computing resource(s) associated with the CEEC being exchanged or otherwise reclaimed and/or reapportioned by the computing resource provider, e.g., IBM Corporation.

This example can be extended to consider two laptops— one for traditional business use during core business hours, the other for occasional customer demos, with a frequency of no less than 1 per month, with an expectation of no use between demos. These are two different CEECs which encapsulate very different expectations for the pattern of intensity of utilization.

This can be extended further to add a server, hosting a customer-facing website available to customers across all time zones, expected to be used at a moderate level of intensity, 24/7. Again, a totally different CEEC, encapsulating a very different expectation for the pattern of intensity of utilization.

Thus, the CEEC not only specifies a requirement for the provider of computing resources to provide a particular set of one or more computing resources configured in a particular manner, i.e. a particular computing environment to be utilized by the contracting party, but also specifies a requirement for the contracting party with regard to a prescribed utilization of the contracting party. This differs significantly from known contractual relationships between contracting parties, e.g., users, and providers of computing resources in a number of ways. For example, one known contractual relationship between a user and provider of a computing resource is known as a service level agreement (SLA). With SLAs, the provider of computing resources is required to provide a particular level of service defined in general terms, e.g., particular bandwidth, bit rates, mean time between failures, mean time to recovery, jitter, or the like, without specification of particular computing resources, in exchange for payment by the user for that designated level of service. There is no requirement on the user's part to utilize computing resources at a specified level of intensity or pattern of utilization, for any particular business purpose, or the like; the only requirement on the user is that the user pay for the designated level of service.

Similarly, another type of contractual relationship between a user and a provider of computing resources is known as a Quality of Service (QoS) agreement in which a guarantee of a certain level of performance of a data flow in a system as a whole is provided, e.g., a required bit rate, delay, jitter, packet dropping probability, bit error rate, or the like. Once again, there is no requirement on the user to utilize the system at a specified level of intensity or pattern of utilization, for a particular business purpose, or the like. The only requirement on the user is that the user pay for the quality of service.

Traditional cloud computing mechanisms are based on such SLAs or QoS type arrangements. That is, when a user contracts with a cloud computing resource provider, the user is contracting for a general level of service or quality of service and does not care how this level of service or quality of services is provided, i.e. does not care what particular computing resources are used to provide the level of service or quality of service. The user simply accesses the "cloud" and expects the particular level of service or quality of service to be provided in whatever manner the cloud resource provider determines to provide the level of service or quality of service. Once again, there is no requirement on the user to actually utilize the cloud's resources at any minimum level of intensity, any minimum pattern of utilization, for any specific business purpose, or the like. All the user is required to do is pay for the SLA or QoS desired from the cloud. Another way to describe this is that the cloud is non-judgemental in its regard for the use of resources—it neither knows nor cares what, if any, business objectives an allocated set of resources is being used to deliver. This is in contrast with the goal of an enterprise in allocating capital to a cloud—the enterprise does so with the expectation of achieving specific business results.

Thus, one of the main differences between the CEEC and the known contractual relationships between contracting parties and computing resource providers is that the contracting party in the CEEC is required to utilize the computing resource(s) at a prescribed level or else the CEEC may be negated, exchanged, or the like and the contracting party may be required to relinquish the contracting party's entitlement to the associated computing resource(s) that the contracting party had under the CEEC. A new CEEC may be generated if the existing CEEC is negated or the existing CEEC may be re-associated with a new set of one or more computing resource(s). The new CEEC or the new association of the existing CEEC may be performed based on measured utilization of the contracting party of the computing resource(s) as well as computing resource capabilities, configurations, and the like, so as to make a determination as to which computing resources most closely conform with the contracting party's utilization of computing resources and/or most closely conform with the requirements under the new or existing CEEC. All of this is done within an organization's market as established by a market maker system that operates on CEECs and sets of computing resources, as described hereafter. The organization's market is defined in terms of achieving a most efficient allocation of computing resources to contracting parties, as may be defined by criteria specified by the organization. These and other mechanisms of the illustrative embodiments will be described in greater detail hereafter.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
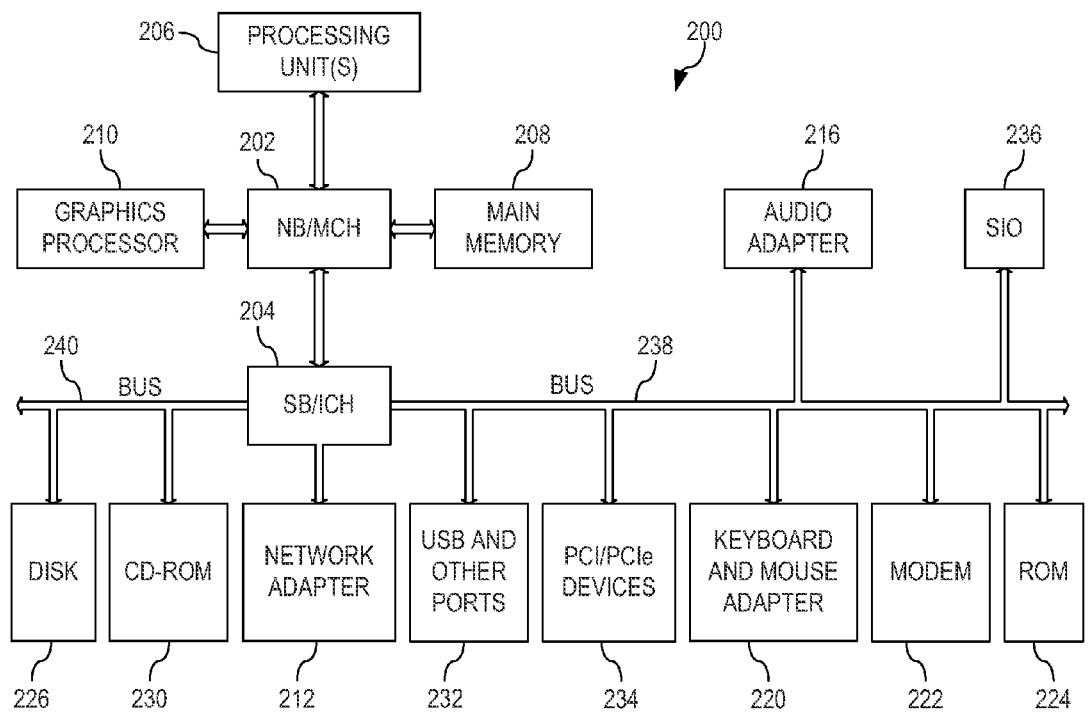
FIG. 2 is an example diagram of a computing device in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Many network based systems, such as shown in FIG. 1 or equivalents thereof, may be coupled together to generate a network of computing resources of an organization, e.g., a company, government, private group, or other legal entity. These computing resources may comprise a small set of computing resources, e.g., 10s to 100s of computing resources, or may comprise a large set of computing resources, e.g., 1000s of computing resources, of various types, capabilities, configurations, and the like. For example, computing resources may range from desktop computers, laptop computers, printers, routers, switches, storage devices, particular processors within a computing device, memories or portions of memories, network devices or appliances, or any other computing resource. Each of these computing resources may be of different types, capabilities, configurations, or the like such that, for example, the organization may have 1000s of desktop computers, some of which may have x86 processor chips, others may have Cell Broadband Engine processor chips, others may have P7 processor chips, and each may have different numbers of processor cores, different software resources loaded on them, or the like, such that different types, configurations, and capabilities are provided.

One or more servers or other computing devices of the organization's network of computing resources may be configured to provide hardware and/or software mechanisms for implementing a CEEC based computing resource management system in accordance with the illustrative embodiments described herein. For example, one or more serves and/or network attached storage devices may be provided for establishing, storing, and managing CEECs and associating these CEECs with a particular contracting party and one or more particular cohorts of computing resources. In some illustrative embodiments, the mechanisms of the illustrative embodiments may interface with existing organizational systems, such as human resources systems and the like, to associated CEECs with particular contracting parties and particular computing resources.

Moreover, one or more servers and/or network attached storage systems may be provided as configuration management database (CMDB) systems for obtaining and storing configuration information regarding computing resources of the organization's network of computing resources. In addition, one or more servers or other computing devices of the organization's network of computing resources may be configured to provide market maker services, cohort management services, utilization scoring services, transaction builder services, cohort and profile management services, system utilization management services, and the like, as will be described in greater detail hereafter.

Overview of CEEC Based Resource Management System

Figure 3:
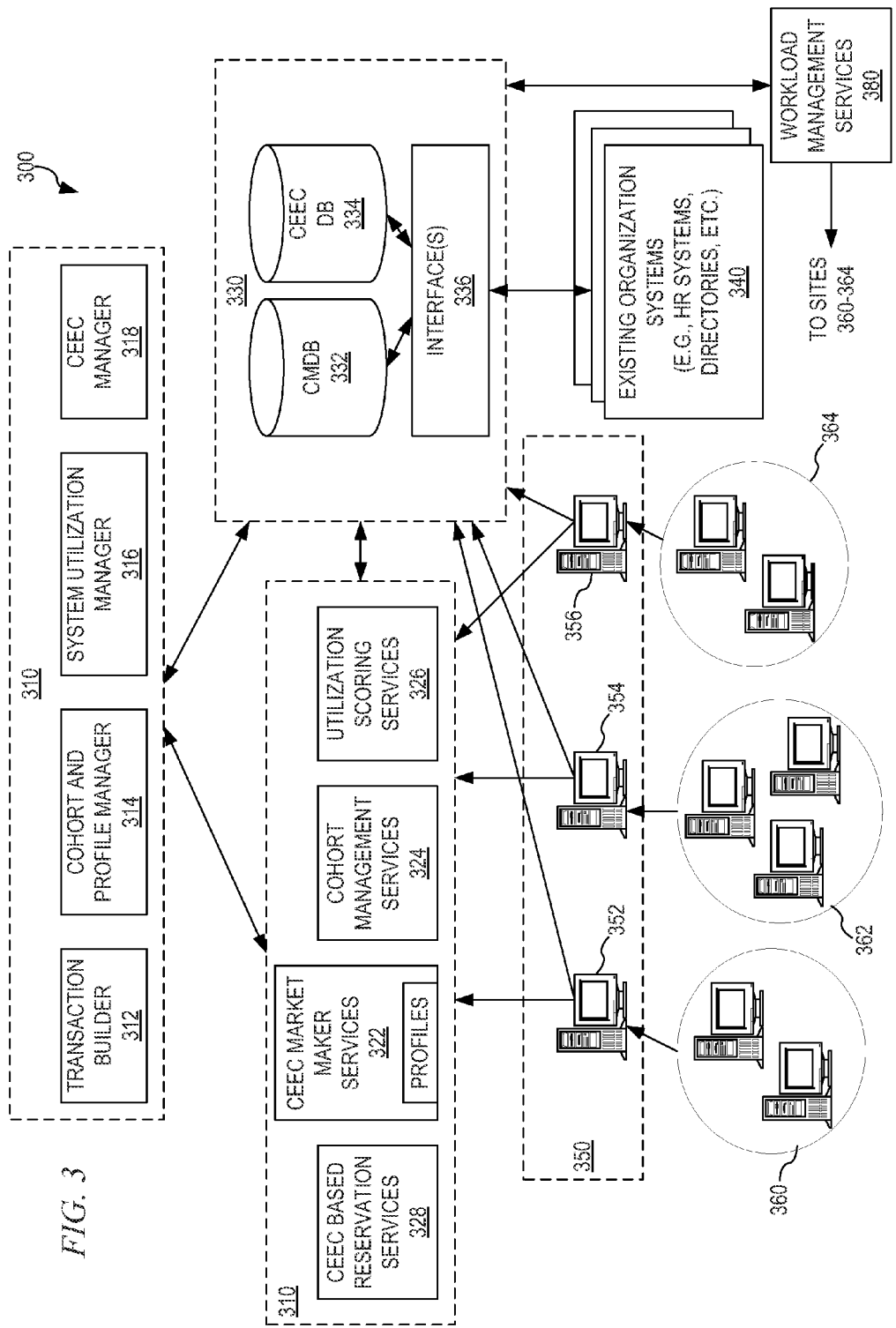
FIG. 3 is an example diagram of the primary operational computing devices for implementing a computing environment entitlement contract based management system in accordance with one illustrative embodiment.

FIG. 3 is an example diagram of the primary operational computing devices for implementing a computing environment entitlement contract based management system in accordance with one illustrative embodiment. The elements shown in FIG. 3 may be implemented, for example, as software instructions executed by one or more processors of one or more computing devices, e.g., servers or the like. In some illustrative embodiments, some of the mechanisms shown in FIG. 3 may be implemented entirely within hardware of the computing system, e.g., as a special purpose hardware device, e.g., Application Specific Integrated Circuit (ASIC) or the like, or as a combination of hardware and software, e.g., firmware or the like. The scope of the illustrative embodiments is intended to cover purely hardware embodiments and embodiments comprising a combination of hardware and software in any particular configuration determined to be appropriate for the particular implementation of the illustrative embodiments, without limitation.

As shown in FIG. 3, the computing environment entitlement contract (CEEC) based resource management system 300 comprises a transaction builder 312, a cohort and profile manager 314, a system utilization manager 316, and a CEEC manager 318 provided as part of one or more web application servers 310. A second web application server (WAS) 320 may be comprised of web services 322-326 which includes marker maker services 322, cohort management services 324, utilization scoring services 326, and CEEC based reservation service 328. A database system 330 is provided that comprises a configuration management database 332 and a CEEC database 334. In addition, the database system 330 may comprise an interface 336 for interfacing with other organizational or enterprise systems 340, such as one or more human resource systems or the like.

The system 300 further comprises an information technology management system 350 comprising one or more information technology management warehouse systems 352-356. The information technology management warehouse systems 352-356 collect utilization information from the computing resources associated with the various site systems 360-364 of the organization. This computing resource utilization information collected by the information technology management warehouse systems 352-356 may be used by the web application services 322-328 to evaluate resource utilization (such as by utilization scoring services 326), perform CEEC based computing resource reservation (such as by CEEC based reservation services 328), perform market based exchanges of CEECs (such as by market maker services 322), and perform cohort management with regard to cohorts of computing resources and cohorts of CEECs (such as by cohort management services 324), all of which will be described in greater detail hereafter.

The database system 330 stores the basic configuration information of the various computing resources of the site systems 360-364 and the CEECs in CMDB 332 and CEEC database 334 that are used along with the resource utilization information obtained from the information technology management warehouses 352-356 to perform the various operations for ensuring compliance with CEECs, performing market transactions, performing cohort management, and scoring resource utilization by web application services 320. The CMDB 332 may store, for example, various tables or other data structures of various types including, for example, daily resource utilization metric information, weekly resource utilization metric information, official resource utilization scores obtained from utilization scoring services 326, profile specifications, cohort specifications, cohort assignments, system configuration information, and system specifications for the various computing resources. The information stored in the CMDB 332 may be obtained from cohort and profile manager 314, information technology monitoring warehouses 352-356, utilization scoring services 326, cohort management services 324, and configuration scanning and discovery clients, such as Tivoli Configuration Manager, Tivoli Application Dependency Discovery Manager, HP Open View, MS System Center Configuration Management Clients, or the like. The profile specifications are the attributes of the profile that are used to interpret the utilization data, e.g., these are attributes such as whether the best or running average data should be used, whether a weekly or daily timescale should be used, how many days of history should be considered, and the like.

The information stored in the CEEC database 334 may be obtained from user specifications of CEEC terms and criteria specified via the CEEC manager interface 318. This information may also be augmented with information obtained from the cohort management services 324 which identifies cohorts of CEECs with which the CEECs described in the CEEC database 334 are associated. Moreover, the CEECs may be associated with particular identifiers of particular computing resources or cohorts of computing resources via the CEEC database 334. The content of the CEECs will be described in greater detail hereafter.

The web application services 310 provide user accessible web application services for performing various operations including building transactions, via transaction builder 312, for use in performing market based exchanges of CEECs via the marker maker services 322, cohort and profile management via the cohort and profile manager 314, system utilization management via the system utilization manager 316, and CEEC management via the CEEC manager 318. The use of these various user accessible web application services 310 will be described in greater detail hereafter.

The Computing Environment Entitlement Contract (CEEC)

The basic element upon which the illustrative embodiments are built is the computing environment entitlement contract (CEEC). The CEEC is an explicit agreement that a given contracting party, e.g., a person, group, department, division, company, or other legal entity, will utilize a specific set of computing resources (e.g., hardware (CPU, RAM, Disk IO, Network IO, Disk Storage and the like), software, physical infrastructure (heating, cooling, rack space, and the like) and/or services (Administration, IT Security, Backup, and the like)), configured in a specific manner (defining a computing environment) for a specified business purpose, at a given level and pattern of intensity of utilization for a given period of time. The CEEC may be specified in terms of one or more data structures that specify the various terms of the CEEC including the CEEC characteristics outlined above. That is, the one or more data structures specify the particular set of computing resources with which the CEEC is associated, either individually or in terms of cohorts of computing resources which will be described hereafter. The one or more data structures further specify the particular configuration of hardware/software of the specified computing resources with which the CEEC is valid, the particular business purpose of the CEEC, the given level and pattern of intensity of utilization in terms of quantifiable metrics over predetermined periods of time, and the given period of time that the CEEC is valid unless negated due to failure to conform to the requirements of the CEEC as discussed hereafter. In addition, the one or more data structures may specify conditions for migration and/or negation of the CEEC.

Figure 4:
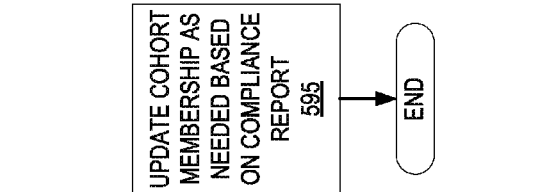
FIG. 4 is an example diagram of a Computing Environment Entitlement Contract (CEEC) data structure in accordance with one illustrative embodiment.

FIG. 4 is an example diagram of an example CEEC data structure in accordance with one illustrative embodiment. As shown in FIG. 4, the CEEC data structure 400 includes CEEC identifier field 410 for specifying an identification of the CEEC with which the CEEC data structure 400 corresponds. The CEEC identifier in the field 410 is a unique identifier that identifies the CEEC for use in associating the CEEC with cohorts of other CEECs, cohorts of computing resources, and performing other management operations including migration of CEECs via a market maker mechanism, negation and replacement of CEECs, and the like. Essentially, the CEEC identifier is used as a way to uniquely differentiate the CEEC from other CEECs managed by the CEEC based resource management system of the illustrative embodiments.

The CEEC data structure 400 further comprises a contracting party identifier field 420 that stores a contracting party identifier to uniquely identify the contracting party, or group of parties, with which the CEEC is associated. For example, the contracting party identifier in field 420 may be a unique employee identifier, department or work group identifier, user identifier, or the like. This contracting party identifier may be used to correlate information from other enterprise systems, such as a human resources system or the like, so that information from these other systems may be associated with the CEEC identified by the CEEC data structure 400. This contracting party identifier may also be used to correlate utilization metric information, and/or scoring metrics obtained from such utilization metric information, with the particular contracting party and corresponding CEEC, for example.

The CEEC data structure 400 further comprises one or more computing resource identifier fields 430 for uniquely identifying the computing resource(s), computing resource cohorts, or other groups of computing resource(s) with which the CEEC is associated, and their associated required hardware/software configurations. That is, for example, the computing resource(s) of an organization's data network(s) may be organized into cohorts as will be described hereafter and the CEEC may be associated with that cohort of computing resources. Alternatively, the CEEC may be associated with a specific computing resource, e.g., a laptop, desktop computer, or the like. The particular configuration information may specify, for example, a number and type of processors, an amount of available memory, an amount of available bandwidth, particular software packages that are installed, or any other identifiable configuration element that is needed to satisfy the business purposes for which the CEEC is established.

In addition, the CEEC data structure 400 further comprises one or more fields 440 for identifying one or more specified business purposes for which the computing resource(s) identified in the fields 430 may be used in accordance with the CEEC. That is, projects, work groups, departments, or other organizational divisions of an organization may be associated with identifiers of the business purposes to which those organizational divisions are devoted, e.g., unique identifiers for software development, a particular project, accounting, management, human resources, etc. Particular computing resources may also be associated with these business purpose identifiers, e.g., particular software packages may be associated with particular business purpose identifiers, e.g., XYZ Accounting software may be associated with a business purpose identifier corresponding to "accounting," XYZ word processing software may be associated with a business purpose identifier of "management," or the like. Particular computing resources, cohorts of computing resources, or the like, may be associated with more than one business purpose identifiers. Moreover, a generic business purpose identifier may further be provided for computing resources that are used generally in all areas of business, e.g., word processing software, particular server computing devices, or the like. The fields 440 may include such business purpose identifiers with which the CEEC is associated such that the CEEC identifies what business purposes the computing resources identified in the fields 430 may be used.

The CEEC data structure 400 further comprises one or more fields 450 for specifying computing resource configuration requirements for satisfying the terms of the CEEC and one or more fields 460 for specifying a given level and pattern of intensity of utilization for a given period of time for which the contracting party is required to utilize the computing resources specified in field 430. The level and pattern of intensity of utilization may be specified in many different ways but is generally intended to specify an amount of usage of the computing resources specified in field 430 that is required over a specified period of time in order for the contracting party to be utilizing the computing resources in accordance with the CEEC terms and requirements. For example, the fields 460 may specify that the computing resources need to be used for the specified business purposes at least 50 percent of the time during the hours of 9 am to 5 pm on weekdays in order for the contracting party to be complying with the terms of the CEEC. Utilization patterns can be defined in terms of exemplar systems, which can describe daily, weekly and monthly peak/trough heights and durations, along with an acceptable variation, such as in percentage acceptable difference. Such patterns may be recorded numerically, either directly or through a visualization interface, for example.

The CEEC data structure 400 may further optionally include fields 470 for specifying migration criteria for migrating a CEEC from one computing resource, cohort of computing resources, or the like. For example, the fields 470 may specify types of computing resources to which the CEEC data structure 400 may be migrated, i.e. re-associated, minimum requirements or configurations of these computing resources, particular conditions under which the CEEC data structure 400 may be migrated, or the like. For example, a desktop workstation, running an x86 CPU, with 3 Gigs of RAM and 500 Gigs of local storage running Windows Server 2008, acting as a Departmental Storage Server could only be migrated to a virtualization cluster running on x86 or x86-64 CPUs, with no less than 3 Gigs of available memory. Furthermore, the CEEC could specify that the Watts (weighted average) consumed at the destination be no greater than 50, in contrast to, for example, a desktop wattage draw of 400, for example.

The CEEC described by the CEEC data structure 400 is not an indivisible entity but instead may be compartmentalized so that various computer resource providers may cooperate to provide the computer resources required to satisfy the CEEC terms. That is, it is not required that the CEEC be established between two parties, i.e. a single computing resource provider and a single contracting party, but may be established between three or more parties. Thus, for example, if one computing resource provider can satisfy a first subset of the terms of the CEEC (e.g., processor throughput) and a second computing resource provider can satisfy a second subset of the terms of the CEEC (e.g., storage capacity), then the CEEC may be compartmentalized into separate sub-CEECs, one for each term of the original CEEC that must be separately satisfied by separate computing resource providers. This allows for greater opportunities for successful transactions in CEEC markets since there is no requirement that a single "buyer" be able to satisfy all of the requirements of a CEEC that is being "sold" via the CEEC market, as will be described in greater detail hereafter. This further distinguishes the CEEC mechanisms of the illustrative embodiments from known workload management mechanisms since such known workload management mechanisms typically move workloads as whole units that are not divisible.

The CEEC data structure 400 of the illustrative embodiments may be created by a system administrator or other privileged user when the privileged user wishes to allocate one or more computing resources to a particular contracting party. In other instances, the CEEC data structure 400 may be created by the CEEC based resource management system automatically, such as in response to a determination that a need is present for negating an existing CEEC and replacing the negated CEEC with a replacement CEEC, as will be described in greater detail hereafter. Assuming that a privileged user is the one that is creating the CEEC data structure 400, this CEEC data structure 400 may be created via a user interface, such as may be provided by the CEEC manager 318 in FIG. 3, for example. Via this user interface, the privileged user, who may log into the CEEC manager using a security login procedure as is generally known in the art, may be presented with various listings of computing resources, cohorts of computing resources, contracting party information, as well as options for specifying the various other parameters of the fields 410-470 of the CEEC data structure 400. The information for populating such lists may be obtained, for example, from the CMDB 332, cohort management services 324, utilization scoring services 326, and/or other elements of the system 300 in FIG. 3. The resulting CEEC data structure 400 may be stored in the CEEC database 334 of FIG. 3 for later access by the other elements of the system 300 for performing CEEC based resource management operations as described hereafter.

Thus, the CEEC forms the basis by which resource management is performed in the system of the illustrative embodiments. The CEEC differs from other computing resource arrangements in that it defines the obligations not only on the computing resource provider to provide particular computing resources configured in a particular manner, but also the obligations of the contracting party to utilize those computing resources for a specific business purpose at a specified level and pattern of intensity of utilization. Known computing resource arrangements place obligations on the provider to provide general computing resource capabilities, e.g., bandwidth, storage capacity, etc., but do not identify specific computing resources and their specific configurations and more importantly do not specify any utilization requirements on the part of the contracting party. To the contrary, the only obligation on the contracting party is to make payment for the computing resources, whether or not the contracting party actually uses those computing resources or not, regardless of the level or pattern or intensity of the use of those computing resources, and regardless of the business purpose of that utilization.

Using the CEEC as a basis, the system 300 includes logic for operating on the CEECs to perform resource and contracting party entitlement management. This logic provides mechanisms for enforcing the terms of the CEECs on both the computing resource provider and the contracting party which includes determining compliance with these terms, determining a need to negate and replace CEECs, determining needs for migrating CEECs from one cohort of CEECs and/or one cohort of computing resources to another, and providing a market maker mechanism to facilitate the negation, replacement, and migration of CEECs. Moreover, this enforcement includes handling and routing workloads to appropriate computing resources (existing or planned) in accordance with associations between CEECs and computing resources, such as through the cohorting mechanisms described hereafter.

As an example of the CEECs and CEEC mechanisms of the illustrative embodiments, assume that a particular organization has a business purpose of "DB2 Performance Testing." Moreover, assume that to perform this DB2 Performance Testing, a computing environment is needed that has a 16-core, 64G RAM, 10 Terabyte system running RHEL Server 5.5, consuming 1500 Watts, with Gigabit Ethernet and fibre-connected SAN storage, with 24/7 on call administrative support. These terms are all terms that would be identified in the terms of a CEEC. Any number of DB2 performance test activities may be conducted on a computing system meeting these requirements under the terms of this CEEC with the CEEC essentially defining the user's entitlement to the resources of the computing system to perform activities on the computing system to achieve the purposes of DB2 performance test activities.

If the DB2 performance testing workloads are to be migrated to a different computing system, then the CEEC must first be migrated, so that there is confidence, by the user, in the destination computing system. The destination computing system is not just comprised of a new or different asset (computing system), but also a new CEEC that ensures that all the required elements of the computing environment will be provided as required under the CEEC. Moreover, the user is obligated to execute workloads related to DB2 performance testing in order to fulfill their side of the CEEC, i.e. the user is provided with the computing environment in exchange for the outputs of the business use, e.g., DB2 performance testing.

The illustrative embodiments facilitate the migration of workload(s) by entering contracting parties into a new CEEC, without which they would not have sufficient confidence to make the migration, and without which the providing party would not be fully informed of the intensity and size of the incoming workloads, defined over an extended timescale. Furthermore, as described in greater detail hereafter, the CEEC market maker mechanisms of the illustrative embodiments allow an organization or enterprise to correctly price both sides of a transaction, which is not possible if all that is being considered is the placement of computing workloads. That is, the cost of the existing environment can be priced, the cost of the destination environment can be priced, and the value of the business output can be priced. These prices can be compared to any or all alternatives to determine which migrations are most beneficial.

Overview of CEEC Market Maker Mechanisms

One of the primary purposes of the CEEC is to enable valuing and trading of entitlements to computing resources for the purpose of optimizing the utilization of computing resources in an organization or enterprise, where optimization is defined as achieving one or more desired business goals of the utilization of the computing resources owned by the organization or enterprise. This valuation allows for the establishment of a CEEC market for valuing and trading entitlements, however, this is not a free market. To the contrary, the CEEC market is a market that is owned by the organization or enterprise, and is designed and operates in accordance with parameters and rules defined and designed to serve the organization/enterprise's interests. In a free market, whatever the parties to the transaction indicate to be a good transaction (e.g., highest price in exchange for a particular product) is a good transaction. However, in a CEEC market, the organization or enterprise defines what is a good transaction based on what transactions most benefit the organization or enterprise goals, not what most benefits the parties of the transaction, i.e. the buyer and seller in the transaction. Thus, market forces are harnessed by the organization and enterprise to ensure that its values are reinforced and realized through the vigor of trading.

The illustrative embodiments make it possible to value a transaction in the context of the organization or enterprise, and to increase the number of profitable transactions in the context of an organization or enterprise, expressing its objectives through market forces. This results in the negation, replacement, and migration of CEECs and their associated entitlements and obligations between cohorts of CEECs, cohorts of computing resources, contracting parties, and the like, all to the ultimate benefit of the organization or enterprise, which at times may be a detriment to individual contracting parties, but such situations would be kept to a minimum.

For example, an enterprise may have an imperative to migrate off of a specific platform, or to vacate a specific physical space, or to decommission a set of leased resources. These are three examples where CEECs can be negated by the enterprise purely because its interests mandate such a negation. The holders of negated CEECs would be forced into the marketplace to find buyers. Such buyers having had their CEECs negated through insufficient use leading to available capacity on desirable (to the enterprise) platforms.

Workload migration is one of the results of this CEEC market process. However, workload migration is not the ultimate purpose of the CEEC. The purpose is the efficient allocation of entitlements to computing resources and resource utilization via market forces. This requires that all of the obligations, terms and considerations that are part of running a given computing environment (i.e. computing resources and their configurations) be encapsulated into a contract, i.e. the CEEC, which defines the manner by which a contracting party may and must use the computing resource(s) they have been allocated for a known business purpose, with terms of use, etc. The "workload" is run within the scope of the parameters of the CEEC and when the CEEC is migrated, it can only do so as a result of trading one CEEC for another in accordance with any migration criteria that may be specified in the CEEC that is being migrated.

The CEEC has value in a static situation to ensure proper use of assets, but the need for the CEEC is particularly acute when one tries to move a user (i.e. contracting party) from one computing resource or resources to another (e.g., from one hardware environment to another) in an organization or enterprise in which there are many thousands of potential pairings, and where there are many inhibitors to the free flow of workloads. That is, workload will not flow naturally to the more efficient vehicles. For example, as previously described above, users are often reluctant to relinquish their existing, and potentially inefficient, computing resources (e.g., a laptop) that they are not fully utilizing, in exchange for shared access to more efficient computing resources because they have a lack of confidence that the shared computing resources will provide them with sufficient functionality that they had with the existing computing resources, no matter how underutilized the existing computing resources may be.

In simpler terms, an employee may be reluctant to give up the laptop that they have been requisitioned and to which they have 100 percent entitlement, even though they do not use the laptop, in exchange for shared access to newer, and more efficient, computing resources (e.g., on a server or the like) because the employee does not have the subjective sense of a guarantee that the computing resources are going to be as accessible to him/her as the laptop currently is, even though it is not being utilized. That is, people tend to abide by the old adage, "a bird in the hand is worth two in the bush" and tend to be more concerned with their own immediate needs than the overall best interests of the organization or enterprise with regard to computing resources and their efficient allocation, e.g., "I know I need X amount of storage space for my projects, I don't know or care what people in the accounting department need for their projects."

In complex organizations, there are also many non-technical barriers to the flow of computing workload that have to do with geographical scope, departmental-level budgeting, and capital vs. expense differentials which make it difficult to buy a more efficient piece of hardware instead of running current inefficient hardware. Optimization is generally realized through centralization and consolidation, but organizational boundaries often present hurdles to such activities. The CEEC is the mechanism that enables the hurdles to be cleared.

With the mechanisms of the illustrative embodiments, a CEEC market maker, such as CEEC market maker services 322 in FIG. 3, allows contracting parties to trade their existing CEECs for new ones that can include all the elements that must be formally enumerated (network bandwidth, storage space, admin support, etc.) along with the basic technical requirements (CPU, RAM, etc.). As long as the CEEC market maker can provide confidence to the contracting parties that their utilization requirements will be satisfied, such as by having the necessary logic and facilities to make both sides of the transaction whole, even if there's a problem at settlement time (which can be satisfied by holding the organization's or enterprise's idle inventory and occasionally purchasing slightly more than is explicitly requested) then a key inhibitor for efficient allocation of computing resources is eliminated. Additionally, the CEECs enable groups within an organization to contribute resources to a shared pool while still retaining all rights to their existing resource requirements through CEECs.

It should again be noted that the CEEC market maker mechanisms of the illustrative embodiments do not operate as a neutral third party. To the contrary, they operate as a driving force for driving the organization or enterprise in a specific direction, and they do so by creating and manipulating market forces biased in that specific direction. The CEEC market maker, e.g., CEEC market maker services 322, has the specific intention, represented in the hardware/software logic of the CEEC market maker, to optimize the efficiency of all utilization (workloads) in the market (the organization or enterprise). The particular manner by which the CEEC marker maker mechanisms drive the market to achieve the operational goals of the organization or enterprise may be defined in a set of CEEC market parameters, rules, or the like, collectively referred to as a "profile," that are processed by the CEEC market maker mechanisms to control the selection of buyers, sellers, and the pairing of buyers and sellers in the CEEC market, as well as the creation, negation, and replacement of CEECs via the CEEC market. Moreover, this may be done with regard to defined collectives of computing resources and/or CEECs, referred to herein as "cohorts," the criteria for defining such cohorts and their membership being specified in the CMDB.

Within the CEEC market, sellers and buyers do not decide themselves to become sellers and buyers. To the contrary, the CEEC market maker mechanisms, expressing the objectives of the organization or enterprise, apply the profiles to utilization and configuration data to identify cohorts of computing resources and CEECs as well as to determine which elements should be buyers and sellers. The profiles that are applied are a collection of one or more parameters, rules, and/or the like, that dictate various aspects of the CEEC market including how and upon what basis to combine computing resources into cohorts (the term "cohort" meaning a "collection" of like elements), how and upon what basis to combine CEECs into cohorts, how and when utilization information is indicative of a need to modify cohort membership, how and when certain utilization information indicates when computing resources or cohorts should be considered buyers or sellers of CEECs, as well as other parameters and rules for dictating the way by which the CEEC mechanisms of the illustrative embodiments execute or operate. The particular basic element for facilitating the CEEC market operations is the transaction, which may be created automatically, manually, or using a combination of automatic and manual processes, such as via the transaction builder 312 in FIG. 3, for example.

The CEEC market maker can assemble transactions, but the individual owners of buyer and seller systems can also participate in transactions pro-actively via the system utilization manager 316. That is, where the transaction builder 312 allows planners, architects and administrators to plan and/or record migrations of sets of seller CEECs to buyers, system utilization manager 316 allows individual users to participate in the market in the context of their individual systems, which have been designated as Buyers or Sellers. Furthermore, in cases where the transaction builder 312 proposes sets of migrations, in some cases the users of those systems will have to affirmatively accept an invitation to participate in such a transaction via the system utilization manager 316. Additionally, system utilization manager 316 is the mechanism whereby the user of a specific system is made aware of the obligations of their CEEC, is enabled to appeal the negation of a CEEC by claiming a different business use, and is enabled to signal willingness to participate in a future transaction.

Since the CEEC market maker mechanisms of the illustrative embodiments govern all the CEECs in use in the CEEC market, these CEEC marker maker mechanisms have the authority to nullify CEECs where one party has failed to meet their obligations. This provides a motivation to contracting parties to utilize their allocated computing resources or relinquish those computing resources, i.e. become sellers, by providing nullification of their contracts when they are using old hardware without justification or use hardware in a way that does not match expectations as defined by the CEECs. Thus, within the CEEC market mechanisms of the illustrative embodiments, sellers become sellers because they do not have a valid CEEC to use their allocated computing resources according to the organization or enterprise which owns the computing resources. Contract nullification also works on the buyer side, where good new computing resources that are not being used fully have their contracts nullified, forcing them to buy additional workload from sellers via the transfer of CEECs and the resulting workloads associated with these CEECs.

Workload Management Based on CEECs

The mechanisms of the illustrative embodiments operate on CEECs to facilitate the association of entitlements specified in the CEECs with computing resources with associated expectations of utilization of the computing resources by the contracting parties with the risk of nullification of the entitlement should the utilization not meet minimum requirements. As a result of the management of CEECs using the mechanisms of the illustrative embodiments, workload management is made possible. Workloads are routed to computing resources and their utilization of the computing resources is monitored in accordance with these CEECs and their associations with computing resources. Thus, when a workload is submitted by a particular contracting party, the CEECs associated with that contracting party may be used as a basis for determining what computing resources are used to execute or otherwise perform the workload.

Workload management mechanisms 380 in FIG. 3 may control and route workloads to computing resources in accordance with the CEECs associated with a particular contracting party submitting the workload and the type of workload being submitted. In one illustrative embodiment, when a workload is received from a contracting party's computing device, one or more CEEC data structures associated with the contracting party may be retrieved from the CEEC database and a type of the workload submitted may be determined, e.g., storage workload, processing workload, etc. A type of business purpose associated with the retrieved one or more CEEC data structures may be determined and matched to the type of the workload. As a result, a CEEC data structure directed to the same business purpose as that of the workload, and thus governing the type of computing resources that can handle the type of workload, is identified. The CEEC data structure may then be used to identify the corresponding computing resources that are governed by the CEEC data structure and the workload management mechanisms 380 may then route the workload to a computing resource specified in CEEC data structure. For example, if a workload is submitted for storing data to a storage system, a CEEC associated with the contracting party that submitted the workload that is concerned with storage systems and is associated with storage system computing resources in the manner described herein (e.g., using cohort associations as described herein) may be used to govern where the workload is directed, i.e. what computing resources to send the workload to.

Thus, while the illustrative embodiments do not directly perform workload management, workload management is a beneficial result obtained by virtue of the CEEC based mechanisms of the illustrative embodiments. For example, a request for a new 'workstation' would be formulated as a request for a CEEC to run specified workloads with a specified pattern of intensity of utilization, with some technical criteria, i.e. a net new sell CEEC. This would be cohorted on the basis of intended business use and matched with a buyer with available compatible capacity.

Cohorts

As mentioned above, one way in which the market maker mechanisms of the illustrative embodiments operate is in providing logic, such as via the cohort and profile manager 314 and/or cohort management services 324 in FIG. 3, to generate and manage cohorts of computing resources and CEECs via the application of profiles to computing resource utilization data, terms and condition information of CEECs, and configuration data of computing resources and CEECs. As a result, cohorts may operate within the market maker mechanisms of the illustrative embodiments as buyers and/or sellers.

Cohorts represent a collection of computing resources and/or CEECs that are similar in some definable way. For example, computing resources having a same or similar configuration, a same or similar type, a same or similar organizational allocation (e.g., associated with a particular site or location of an organization), physical location, logical location in a data network of the organization or enterprise, or the like, may be combined into a same cohort. Similarly, CEECs having same or similar terms or sub-set(s) of terms may be combined into a same cohort of CEECs, e.g., CEECs governing storage capacity may be collected together in a cohort, CEECs associated with contracting parties in a same or similar division or department of the organization or enterprise may be collected together in a cohort, CEECs having a same or similar business purpose may be collected together in a cohort, or the like. Cluster analysis mechanisms may be used to identify these similar computing resources and CEECs so that they may combined into collections, or cohorts, of computing resources and CEECs.

For example, the cohort management services 324 may analyze configuration information for computing resources stored in the configuration management database 332 and CEEC terms and conditions identified in the entries of the CEEC database 334, and perform cluster analysis on this information to generate one or more cohorts of computing resources and one or more cohorts of CEECs, where each cohort has members that have similar characteristics to other members of the cohort. "Similarity" may be measured in many different ways, e.g., same or similar (i.e. within a defined tolerance) number of processors, same or similar amount of memory, same or similar software configurations, same or similar resource utilization requirements, same or similar business purposes, same or similar organizational location, or the like. The particular rules and parameters used for establishing a cohort are identified in profiles that define the cohorts and may be recorded in the CMDB, as will be described hereafter.

Once cohorts of computing resources are created and cohorts of CEECs are created, the cohort management services 324 may have logic for matching a cohort of CEECs (or simply a "CEEC cohort") with one or more cohorts of computing resources (or simply "computing resource cohorts") based on those computing resource cohorts that provide the computing resources determined to be necessary to satisfy the same or similar terms of the CEECs in the CEEC cohort. In this way, entitlement contracts associated with users may be associated with one or more computing resources for satisfying those contracts in an automated manner. Of course, cohort information and associations between cohorts may be output to a system administrator or other authorized user via the cohort and profile manager 314 so that that individual may review, cancel, modify, override, or otherwise change the cohorts and their associations when desired. The association of a CEEC cohort with one or more computing resource cohorts essentially reserves those computing resources, or at least a portion of those computing resources in the computing resource cohort(s) of use by contracting parties to the CEECs in the CEEC cohort. Thus, once an association between a CEEC cohort and a computing resource cohort is made, the CEEC enforcement logic becomes operative.

Cohorts that are matched and associated with each other in this way may have their utilization monitored and analyzed in view of the association between cohorts. That is, computing resource utilization information may be gathered, analyzed, and monitored for the computing resources that are members of a computing resource cohort based on the terms and conditions specified in the CEECs of the CEEC cohort(s) associated with the computing resource cohort. Essentially, this gathering of information, analysis and monitoring is done to ensure that the terms and conditions of the CEECs are being complied with by both the computing resource providers and the contracting parties, e.g., the end users. Thus, the collection of utilization information, its analysis and monitoring is performed with regard to the particular computing resource utilization terms specified in the CEECs of the CEEC cohort but the collection is performed from the computing resources specified in the computing resource cohort(s) with which the CEECs are associated. Thus, for example, if a CEEC specifies that a user must use their allocated processors 50% of the time for running software packages directed to accounting operations, then the processor utilization metrics collected for the computing resources of the computing resource cohort with which this CEEC is associated will be analyzed to determine if this user was running accounting software at least 50% of the time during a specified period of time.

It should be appreciated that the collection computing resources and CEECs into cohorts does not need to be limited to collection based on the computing resource configurations or CEEC terms and conditions as a whole. To the contrary, sub-parts of a CEEC, for example, may be individually assigned to different CEEC cohorts based on the terms and conditions of the CEEC associated with that sub-part. For example, a CEEC may specify terms associated with allocation and contracting party utilization of processor resources, storage system resources, web application resources, and the like. Each of these may be separately satisfiable by different computing resources of the organization or enterprise and thus, may be separated out into separate CEEC cohorts such that one CEEC may be associated with multiple CEEC cohorts and each of these associations with separate CEEC cohorts may be separately managed by the mechanisms of the illustrative embodiments and may be separately the subject of CEEC market maker operations. Similarly, Cohort membership is not only based on similar terms in CEECs, or similar configurations of computing resources, but may further be based on similar utilization metrics. That is, even though two computing resources may have similar configurations and thus, would normally be part of a same cohort, if their utilization metrics indicate that these computing resources are being utilized in significantly different ways or at different levels or patterns of intensity of utilization, then these two computing resources may be separately classifiable into different cohorts. The same is true of CEECs where utilization metrics associated with a CEEC may be used as a basis for determining if the CEEC should be classified in a particular cohort or not. The utilization metrics may be obtained in any known manner, such as by using agent applications running as daemon processes on the computing resources, probing the computing resources, or the like. The utilization metrics may be collected by data collection mechanisms, such as information technology monitoring warehouses 352-356 in FIG. 3, and analyzed to generate utilization information, such as generating utilization scores via utilization scoring services 326 for example. This utilization information may be associated with the various computing resources and CEECs via the database systems 330 and may be used by a cohort and profile management mechanism, such as cohort management services 324, to dynamically evaluate cohort membership and readjust cohort membership in accordance with changes in utilization of the computing resources and CEECs. Similarly, changes in configuration of computing resources may be identified via the database systems 330 and used as a basis for dynamically adjusting cohort membership when determined necessary to optimizing the organization or enterprise's computing resource utilization.

The utilization scoring services 326 may operate on collected utilization metrics, such as may be stored in configuration management database (CMDB) 332 and/or CEEC database 334 to generate a score for each member of a cohort with regard to the metrics of interest and statistical representations of interest for the particular cohort as specified in a profile defining the cohort, as will be described in greater detail hereafter. These scores may be generated in accordance with rules and parameters of the logic of the utilization score services and/or weights defined in the profiles of the cohorts which may be static or dynamically determined weights, again described hereafter. The resulting scores provide a relative measure of a member of a cohort's utilization relative to other members of the cohort. This utilization may be compared to required utilization as specified in the terms of the CEECs with which a member of a computing resource cohort is associated to generate an overall representation of whether the computing resource is being utilized in accordance with the terms of a CEEC or whether the terms of a CEEC are being satisfied by the computing resource utilization that was analyzed. The resulting scores may be used as a basis for adjusting membership in cohorts, negating, replacing, and/or migrating CEECs, or the like.

Representations of these scores may be generated and presented to an authorized user via the cohort and profile manager 314, for example. For example, a graphical representation of the scores of CEECs of a CEEC cohort may be presented along with scorings of computing resources of one or more computing resource cohorts with which the CEEC cohort is associated, such as in a multi-axis graph or the like, so that one can determine which CEECs are being satisfied by the utilization of the computing resources and which computing resources are being utilized to satisfy the CEEC terms in the CEEC cohort. Various graphical representations may be used to assist in the visualization of this information including utilizing color codes, e.g., read/yellow/green, to further identify and provide conformance information and reporting with regard to the terms and conditions of the CEECs in the CEEC cohort. Such graphical representations can be provided on a per CEEC basis, on a CEEC cohort basis, or on a collection of CEEC cohorts basis, for example.

Figure 5:
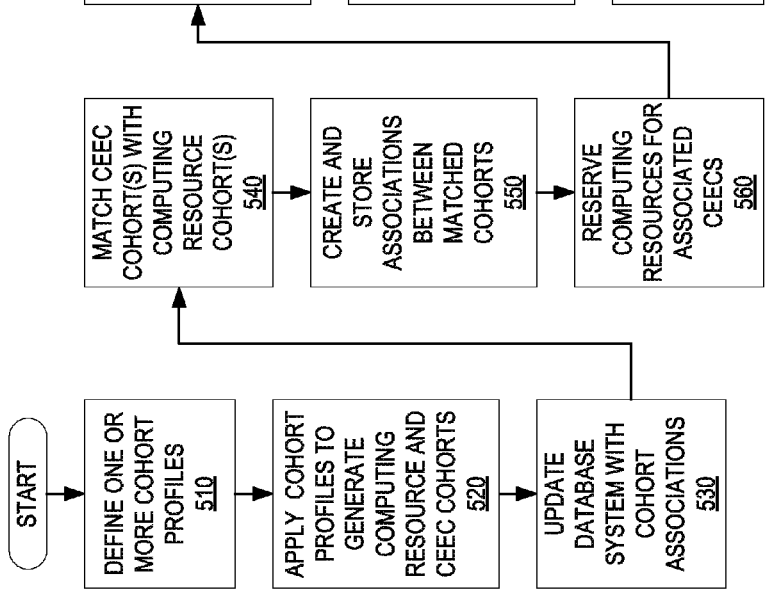
FIG. 5 is a flowchart outlining an example operation for generating associations of cohorts in accordance with one illustrative embodiment.

FIG. 5 is a flowchart outlining an example operation for generating associations of cohorts in accordance with one illustrative embodiment. The operation outlined in FIG. 5 may be performed, for example, by cohort management services 324 either alone or in combination with cohort and profile manager 314 in FIG. 3, for example. It should be appreciated that FIG. 5 is an overview and many details, specific to the particular implementation of the illustrative embodiments, may not be explicitly shown in FIG. 5 but will be readily apparent to those of ordinary skill in the art in view of the present description.

As shown in FIG. 5, the operation starts with the defining of one or more cohort profiles, at least one for specifying a computing resource cohort and one for specifying a CEEC cohort (step 510). The defined cohort profiles are applied against computing resource configuration information and CEEC information in a database system to generate at least one computing resource cohort having one or more members and at least one CEEC cohort having at least one member (step 520). The cohort membership of the CEECs and computing resources is noted and stored in the database system in association with entries for the computing resources and CEECs (530). As mentioned above, it is possible for a single CEEC to be part of a plurality of CEEC cohorts, such as in the case were terms and conditions of a CEEC are sub-divided. Similarly, computing resources may be part of a plurality of computing resource cohorts by sub-dividing their configuration information into separate types of configuration items. Thus, one CEEC cohort may be associated with multiple computing resource cohorts and vice versa.

Thereafter, the common or similar terms of the CEEC cohort(s) are compared against the common or similar configuration information for the computing resource cohorts to match one or more computing resource cohorts with one or more CEEC cohorts (step 540). Associations between cohorts are created and these associations may be stored for later use (step 550). Based on these associations, computing resources, or portions of computing resources, are reserved or allocated to CEECs in the associated CEEC cohort (step 560)

Computing resource utilization metrics are collected from the various computing resources and stored in the database system (step 570) either in raw form, as analyzed utilization information, or both. Based on the associations of cohorts, computing resource utilization information in the database system is analyzed to determine whether terms and conditions of CEECs in CEEC cohorts are being complied with by contracting parties based on their utilization of the computing resources in the computing resource cohort(s) with which the CEECs are associated (step 580). Based on the determination of compliance with CEEC terms and conditions, graphical representations of compliance reports may be generated (step 590) and cohort membership may be updated (step 595). The operation then terminates.

Thus, with the illustrative embodiments, mechanisms are provided, in a data processing system comprising at least one computing device and a plurality of computing resources, for reserving computing resources of a data processing system. These mechanisms may establish one or more computing environment entitlement contract (CEEC) data structures, each CEEC data structure defining terms of a business level agreement between a contracting party and a provider of computing resources of the data processing system, wherein the terms of the CEEC specify a set of computing resources having a specified configuration that are to be used by the contracting party for a specified purpose at a specified level and pattern of intensity for a specified period of time. These mechanisms may further associate a set of one or more computing resources with a set of one or more CEECs. Furthermore, the mechanisms may manage the set of one or more computing resources in accordance with the associated set of one or more CEECs. In response to the contracting party failing to utilize the computing resources in the selected computing resource cohort for the specified purpose at approximately the specified level and pattern of intensity during approximately the specified period of time, then logic of the at least one computing device invalidates the CEEC. Such invalidation may result in replacement of the CEEC with another CEEC and/or migration of the invalid CEEC from one set of computing resources to another.

Relationships amongst resources, workloads and CEECs may be very complex, as described, but may also be very simple. It is important to note that simple CEECs can be traded into much more complex environments. For example, a CEEC may call for a standalone desktop workstation to be used for "basic office productivity" (email, word processing, etc.). This CEEC can be traded into a highly complex, centralized virtualization cluster where the same business activities will be executed on a vastly more complex platform but which will appear to the user to be not much different, and will be used the same way to do the same thing as on the standalone desktop workstation. This underlines why the CEEC is required to provide confidence to the user that their requirements will be protected through this process of moving from an environment over which they have total control to an environment over which they have limited or no control, and which they may not understand, which may be run by people not known to them, in a different geography, etc.

The associating of the set of one or more computing resources with a set of one or more CEECs may comprise determining a first set of one or more computing resource cohorts of computing resources based on configuration information for each of the computing resources. Computing resources within a computing resource cohort may be of a similar type and have a similar configuration with each other. The associating may further comprise determining a second set of one or more CEEC cohorts of CEECs based on attributes of one or more CEECs maintained by the data processing system, and matching a selected CEEC cohort in the second set with a selected computing resource cohort in the first set based on terms of CEECs in the selected CEEC cohort and characteristics of the selected computing resource cohort.

Managing the set of one or more computing resources in accordance with the associated set of one or more CEECs may comprise enforcing a CEEC in the selected CEEC cohort on computing resources in the selected computing resource cohort in accordance with the terms of the CEEC. The enforcement of the CEECs may comprise obtaining resource utilization metric information, determining if CEEC terms are being complied with based on the computing resource utilization metric information, and determining whether to negate, replace, and/or migrate a CEEC from one CEEC cohort to another or from one computing resource cohort to another based on actual computing resource utilization when compared to the terms in the CEEC.

Association of CEECs and Cohorts with Existing Organizational System Information The CEECs, cohorts, and the like, may be associated with existing organization information such as employee information, department, division, and location information, business units, and the like. For example, the database system 330 may comprise one or more organizational system interfaces 336 for interfacing the database system 330 with these existing organizational systems to thereby obtain additional information from these existing organizational systems and/or link the CEECs, cohorts, and other data structures of the CEEC based resource management system 300 with these existing organizational systems. In one illustrative embodiment, contracting parties may be employees or departments of the organization or enterprise and identification information for these employees or departments may be obtained from the organizational systems 340 which may comprise employee directories, organizational configuration systems, human resource systems, and the like.

The information obtained from the existing organizational systems 340 may be used by the database system 330 to populate fields in entries of the CEEC database 334 and/or the CMDB 332 to thereby associate the information from these other organizational systems 340 with the CEECs and computing resources and their cohorts. For example, a particular employee may be allocated a CEEC and the employee's information may be automatically retrieved from an existing organizational system 340, e.g., a human resources system, and used to populate fields of the CEEC database 334 entry for the CEEC, e.g., employee identification number, name, department, business unit, etc. Similarly, the existing organizational system 340 may be updated to link information from the database system with an entry for the contracting party, e.g., identifiers of CEECs associated with the employee, identifiers of computing resource cohorts associated with the CEECs that are associated with the employee, etc.

Moreover, the information obtained from the existing organizational systems 340 may be used by the cohort management services 324 and the cohort and profile manager 314 to assist in identifying members of cohorts, i.e. assist in generating cohorts. For example, profiles may be generated for particular business units, departments, or other organizational units within an organization or enterprise and information obtained from these existing organizational systems 340 may be used to generate these profiles and populate the corresponding cohorts.

As another example of the way in which these organizational systems 340 may be used to assist in the creation and management of cohorts, computing resource utilization information may be obtained and analyzed for various cohorts to identify trends and patterns of utilization under the CEECs associated with the computing resources and the organizational information from the organizational systems 340 may be used to identify other contracting entities, business units, and the like, that may be associated with other cohorts having similar utilization trends or patterns with resulting reports being generated. This information may then be used to determine cohort memberships between such organizational entities, e.g., employees, business units, departments, etc.

Profiles

The profiles for defining cohorts may be defined by a system administrator or other authorized individual via one or more user interfaces provided, for example, by cohort and profile manager 314 in FIG. 3 either alone or in concert with the logic of cohort management services 324. Profiles may be generated for defining various cohorts of computing resources and/or CEECs. The profiles specify the parameters used to define a cohort as well as what computing resources/CEECs may be members of the defined cohort. The profiles may specify which utilization metrics are evaluated to determine membership in the cohort as well as what levels and/or patterns of utilization associated with these metrics are indicative of membership in the cohort, removal from the cohort, and the like. As mentioned hereafter, these levels and/or patterns of utilization for adjusting membership in a cohort may be dynamically determined based on utilization information gathered, e.g., by selection of exemplar and counter-exemplar members of a cohort.

The profiles can be applied to computing resource configuration information (as may be obtained from CMDB 332, for example) and CEEC data (as may be obtained from CEEC database 334, for example), both of which may store utilization information corresponding to one or more metrics, whether this utilization information be raw metric data or the result of processing raw metric data, e.g., utilization scores or the like. The profiles may be applied to the computing resource configuration information and CEEC data to identify which computing resources and which CEECs should be members of the corresponding cohorts. The database systems 330 may be updated accordingly to include identifiers of the cohorts with which particular computing resources and CEECs are associated.

Figures 6, 7:
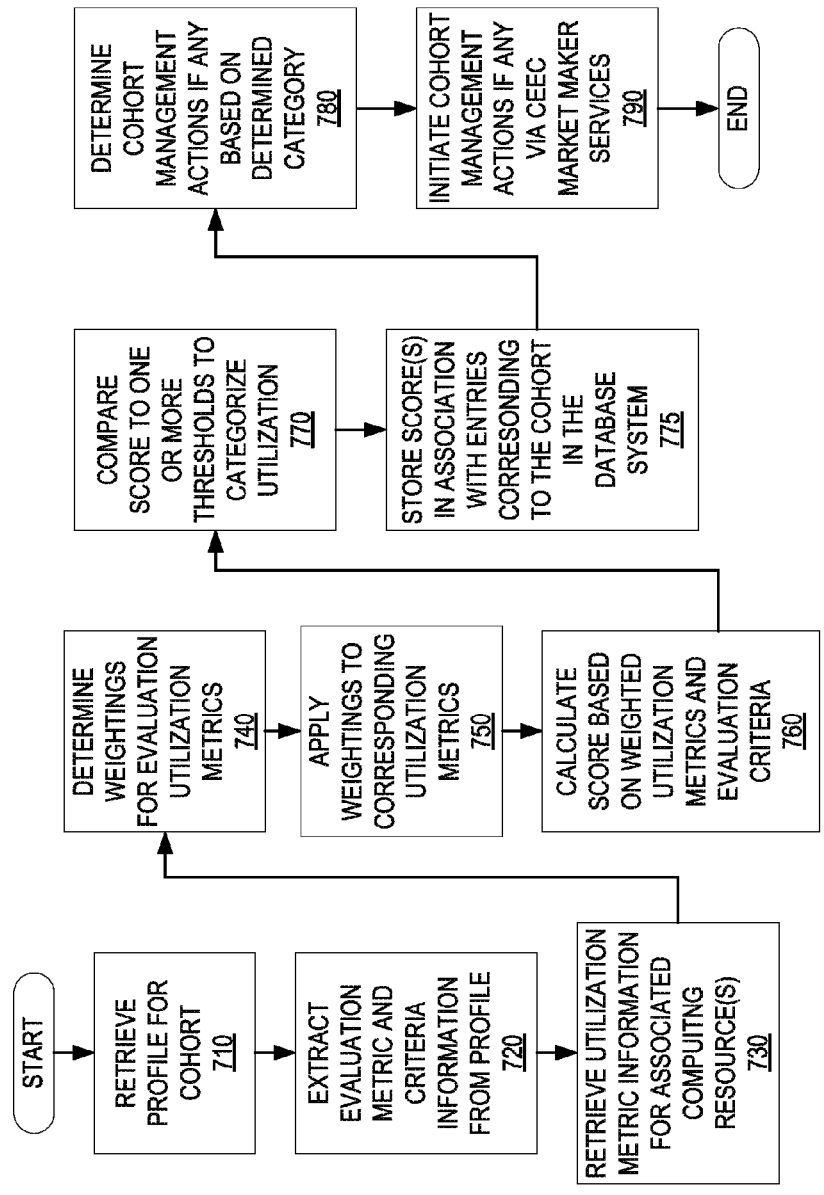
FIG. 6 is an example diagram of a cohort profile data structure in accordance with one illustrative embodiment.
FIG. 7 is a flowchart outlining an example operation for generating a computing resource utilization score in accordance with one illustrative embodiment.

The profiles may be defined in many different ways depending upon the particular implementation. Preferably, as shown in FIG. 6, the profiles 600 comprise a unique identifier 610 of the profile, characteristics of computing resources or terms of a CEEC 620 that are indicative of membership in a cohort corresponding to the profile, identification of the particular utilization metrics 630 that are to be used to evaluate membership in the corresponding cohort, criteria for evaluating these metrics 640, and criteria 650 for determining when to adjust membership in the corresponding cohort and corresponding actions 655 associated with these adjustment criteria, among other parameters and rules of the profile 660. The criteria for evaluating the metrics 640 for determining membership in the cohort may include, for example, a time frame over which to make the evaluation, basis for measuring the utilization (e.g., maximum, minimum, average, etc.), biases for such an evaluation (e.g., best, worst, latest, running average, etc.), and/or the like.

The adjustment criteria 650 and corresponding actions 655 may specify, for example, ranges of metric utilization information which would result in the particular actions needing to take place. These actions 655 may be CEEC market maker actions, e.g., buy, sell, hold, or retire, where buy refers to adding more CEECs to a computing resource or cohort, sell refers to migrating CEECs off of the computing resource or cohort, hold means to take no action, and retire means to permanently retire the computing resource or cohort so that it is not reused, or otherwise negating the CEEC/CEEC cohort. Thus, the CEEC market maker services 322 may utilize the profiles as a mechanism to assist in selecting buyers and sellers within the CEEC market managed by the CEEC market maker services 322.

The cohort management services 324 may store the profiles 600 generated by the system administrator or other authorized user so that they may be applied to the computing resource configuration information in the CMDB 332 and the CEEC terms and conditions specified in the CEECs stored in the CEEC database 334. Initially, when the system initializes, when a new computing resource is added to the system, or when a new CEEC is created, there will not be any utilization information in the database system 330 to use as a basis for determining membership in cohorts defined by the various profiles 600. Thus, membership in cohorts may be initially determined based on computing resource configuration information and CEEC terms/conditions specified in the database system 330. Thereafter, as the computing resources are utilized under various CEECs, utilization information may be collected/generated and used as a basis to dynamically adjust the membership of computing resources and CEECs in the various cohorts defined by the profiles in accordance with the adjustment criteria specified in these profiles 600. Thus, the cohort management services 324 may continuously or periodically monitor and apply the profiles to the information stored in the database system 330 to determine adjustments to cohort membership.

The profiles 600 created and managed via the cohort and profile manager 314, and stored in association with the cohort management services 324, are updatable by an authorized user via one or more user interfaces provided by the cohort and profile manager 314. Moreover, these profiles 600 may be updated automatically based on analysis of utilization metrics for the members of the cohorts, e.g., selecting different utilization metrics or different weightings to use for evaluating the operation of a cohort based on distributions of utilization metrics, identification of representative cohort members, outlier members, and the like, as will be described hereafter. In response to these profiles 600 being updated, the updated profiles 600 may be applied by the cohort management services 324 to the existing members of the cohort to determine if the membership should be maintained or modified, as well as configuration information and CEEC information in the database system 330 for other computing resources and/or CEECs that may be candidates for inclusion in the cohort in view of the updated profile 600.

Use of Profiles to Score Utilization Information to Manage Cohorts

As mentioned above, the profiles 600 may specify computing resource utilization information by which to evaluate the utilization of members of a cohort. Each member of a cohort is evaluated in accordance with the same profile 600 that defines the cohort. Such evaluation may be performed, for example, by the cohort management services 324 either alone or in combination with the cohort and profile manager 314 either automatically or with manual intervention by an authorized user. The evaluation may be performed based on the rules, parameters, etc., specified in the profile 600 as they are applied to computing resource utilization information that may be obtained from the database system 330, which may include utilization scores generated by utilization scoring services 326.

For example, the profiles 600 may designate that for a particular cohort, the most important utilization information to be used for evaluating the members of the cohort may be storage capacity metrics, processor cycles statistics, average number of processes executed over a predetermined period of time, or the like. This computing resource utilization information may be obtained from the database system 330 and/or the utilization scoring services 326, for example. The utilization information may be used to "score" members of a cohort and/or the cohort as a whole in accordance with scoring rules and weightings. Such scoring may be done, for example, by utilization scoring services 326 in FIG. 3, for example. The resulting score may be categorized into predefined categories of resource utilization scores indicative of a relative utilization of the computing resources under the associated CEECs of the CEEC cohort for which utilization scoring is desired, e.g., scores may be categorized into "green," "yellow," and "red" categories indicative of whether resource utilization is in a range indicative of the computing resource or cohort being used in accordance with CEEC terms, within an acceptable tolerance of the CEEC terms, or not within an acceptable tolerance of the CEEC terms. When profiles 600 are updated, the scoring of members of the cohort and/or other computing resources/CEECs that may become members of a cohort, may likewise be updated based on any changed resource utilization information parameters, weightings, or the like, in the updated profile.

For example, the bases for the categorizations may be green (indicating no more utilization can be reasonably expected of this set of resources), red (these resources are not being used), and yellow (utilization somewhere between the thresholds defining red and green categorizations). These categorizations in turn may be associated with corresponding actions that are expected to be performed, which may include negation of the CEEC, replacement of the CEEC, migration of the CEEC, or the like.

For example, the profile for a cohort of CEECs may specify the evaluation criteria for evaluating computing resource utilization under the CEECs of the cohort (keep in mind again that members of a cohort are evaluated in accordance with the same profile that specifies the definition of the cohort). These evaluation criteria may include, for each computing resource metric of interest specified in the profile, a measurement basis (e.g. minimum, maximum, average, volatility, etc.), a time scale (e.g., hourly, daily, weekly), a scoring timeframe (e.g., number of days to consider), and any scoring bias (e.g., best, running average, latest). These evaluation criteria specify the way computing resource utilization metric measurements are to be interpreted and processed to arrive at a single score indicative of the computing resource utilization and how that computing resource utilization measures with regard to the terms and conditions of the CEECs of the CEEC cohort. These evaluation criteria may be set in accordance with the business objectives of the organization or enterprise to determine how computing resource utilization data is to be interpreted and applied to determinations as to whether CEEC terms are being complied with by contracting parties and computing resource providers.

Evaluations can be used directly or in aggregate, meaning that the acceptable utilization pattern may be discernible within a given timescale, or within a set of multiple instances of the given timescale, or the like. For example, evaluations may be performed with regard to an acceptable utilization on at least one day a week over a timeframe of the past six weeks.

The scoring operations performed by the utilization scoring services 326 may be performed in various ways based on the evaluation criteria specified in the profile for the cohort. The particular functions or mathematical algorithms used to generate the score are not the focus of the present invention and any suitable function or mathematical algorithm that can take the evaluation criteria specified in the profile and generate a single unified score for the CEEC and/or computing resource, is intended to be within the spirit and scope of the illustrative embodiments.

In some illustrative embodiments, these functions and/or mathematical algorithms may make use of weightings that are applied to various ones of the computing resource utilization metrics and/or the evaluation criteria specified in the profile. These weightings may be fixed and predetermined, e.g., CPU usage has a weight of 1.0 whereas storage capacity utilization has a weighting of 1.25 and average weekly bandwidth utilization has a weighting of 2.15. These weightings may be set to any desirable value to achieve the business goals of the organization or enterprise with regard to CEEC and computing resource management.

Alternatively, these weightings may be dynamically determined and may be specific to the particular profile and cohort such that different profiles and cohorts may utilized different weightings for the same computing resource utilization metrics. These dynamically determined weightings may further be determined based on a statistical analysis of the computing resource utilization metrics collected for the computing resources of the computing resource cohort(s) with which the CEECs of the CEEC cohort are associated. That is, the statistical analysis of the computing resource utilization metrics for the computing resources may indicate that particular computing resources, e.g., CPU capacity, storage capacity, memory capacity, bandwidth, etc., tend to be more indicative of the actual relative utilization of the computing resource when compared to other computing resources in a cohort and may be more indicative of whether the computing resource is being utilized in compliance with terms of the CEECs with which the computing resource cohort is associated, and thus, the weighting of this computing resource utilization metric may be dynamically increased relative to other computing resource utilization metrics that are being monitored under the profile for this CEEC cohort with regard to the computing resource cohort(s). Thus, statistical analysis of computing resource utilization metrics may be used as a basis for determining a dynamic weighting of these computing resource utilization metrics when generating a score for the computing resources, computing resource cohort, CEECs, or CEEC cohorts.

Additionally, weighting ratios enable the detection of utilization patterns that do not conform with the expectation for the assigned cohort, or that do conform to the expectation of some other cohort. In some cases, out of ratio utilization patterns, such as 100% CPU utilization combined with low RAM utilization, indicate a system problem. Thresholds defined in the profile determine how such utilization should be interpreted in the context of the cohort.

The weightings may be used as a mechanism for allowing profiles to be fit to the determinative limitations of the computing resources of the cohorts defined by the profiles. Thus, for example, with computing resources whose utilization is primarily limited by the amount of available memory resources, the weighting for memory resources may be heavier than for other cohorts having computing resources where memory resources are not as limited. Thus, the weightings are customizable in each profile such that they may be set appropriately for the particular set of computing resources and CEECs that comprise the cohort defined by the profile.

In view of the above, it can be appreciated that the illustrative embodiments provide mechanisms, in a data processing system comprising at least one computing device and a plurality of computing resources, for monitoring a use of the computing resources relative to a computing environment entitlement contract. These mechanisms establish one or more computing environment entitlement contract (CEEC) data structures, each CEEC data structure defining terms of a business level agreement between a contracting party and a provider of the data processing system, wherein the terms of the CEEC specify a set of computing resources having a specified configuration that are to be used by the contracting party for a specified purpose at a specified level and pattern of intensity for a specified period of time. These mechanisms further generate a CEEC cohort comprising a collection of CEECs having similar terms and a collection of computing resources that have characteristics that satisfy the similar terms of the CEECs in the collection of CEECs. Furthermore, these mechanisms collect, within one or more computing resource collections, or cohorts, resource utilization metrics measuring an amount of usage of each computing resource in the collection of computing resources in accordance with the similar terms of the collection of CEECs. Furthermore, the mechanisms of the illustrative embodiments determine relative weightings of resource utilization metrics for various ones of the computing resources in the collection of computing resources based on business objectives defined for the CEEC cohort. Moreover, the mechanisms of the illustrative embodiments report CEEC cohort utilization of the collection of computing resources based on the collected resource utilization metrics and the determined relative weightings of the resource utilization metrics.

FIG. 7 is a flowchart outlining an example operation for generating a computing resource utilization score in accordance with one illustrative embodiment. The operation outlined in FIG. 7 may be performed, for example, by utilization scoring services 326, for example, when scoring the utilization metrics for computing resources in computing resource and/or CEEC cohorts.

As shown in FIG. 7, the operation starts with the utilization scoring service 326 retrieving a profile for a cohort that is the subject of the utilization scoring operation (step 710). The evaluation metric and evaluation criteria information for that cohort is extracted from the retrieved profile (step 720) and utilization metric information for computing resource(s) associated with the cohort are retrieved or collected (step 730). This retrieval may be to retrieve the utilization metric data from the database system 330 for example, in cases where the data has already been collected from the information technology management systems 352-356, or may be the actual collection of the utilization metric data from the information technology management systems 352-356 for the specific computing resources.

The weightings to be applied to the evaluation utilization metrics retrieved/collected are determined (step 740). This may be done by retrieving static pre-defined weightings which may be specified, for example, in the profile 600. Alternatively, the weightings may be determined dynamically by analysis of trends and statistical information from the utilization metrics previously collected and analyzed for this particular cohort. In the case where the weightings are determined dynamically, these weightings may likewise be stored in fields of the profile 600 for retrieval by the utilization scoring service 326, but may be dynamically updated. Regardless of the particular implementation, the weightings are specific to the cohort being scored and other weightings for other cohorts, either for the same types of utilization metrics or for other types of utilization metrics, may be different from the weightings for the present cohort.

The weightings are applied to the corresponding utilization metrics (step 750) and a score is calculated based on the weighted utilization metrics and the evaluation criteria specified in the cohort profile 600 (step 760). As mentioned above, the evaluation criteria may specify various criteria for evaluating the weighted utilization metrics including a time frame over which to make the evaluation, basis for making the evaluation (e.g., maximum, minimum, average, etc.), biases for such an evaluation (e.g., best, worst, latest, running average, etc.), and/or the like. These may be applied along with the weightings to the utilization metrics using one or more mathematical algorithms or formula to generate a single score for the cohort or for the member of the cohort. Scores may be determined directly within the timescale, or aggregated for each timescale within the timeframe, or the like, e.g., latest daily score, or a daily score for each day in the timeframe, etc.

The score is then compared to one or more thresholds to categorize utilization of the cohort as to whether the utilization is in conformance with utilization requirements of the cohort (step 770). The score(s) generated in this manner may be stored in association with entries corresponding to the cohort in the database system (step 775) and a determination is made as to whether the categorization of the utilization based on the scoring is indicative of a need to perform cohort management actions and what actions should be performed based on the categorization (step 780). These cohort management operations may be, for example, to buy, sell, hold, or eliminate CEECs associated with the cohort, initiate tickets for adding additional computing resources to a cohort, initiate tickets to decommission computing resources associated with the cohort, or the like. The determined cohort management actions may then be initiated, such as via the CEEC market maker services 332, for example (step 790) and the operation terminates.

Selection of Exemplar Members of Cohorts

In addition to the above, the scoring performed by the utilization scoring services 326, in accordance with the profile 600 and computing resource utilization information, may be used as a basis for selecting one or more exemplar members of the cohort. For example, a list of members of a cohort may be provided, ordered by score, and then an exemplar member of the cohort may be selected from the list, e.g., a member representative of a mean score of the members of the cohort, a member having a closest score to an overall score for the cohort as a whole, or the like. The exemplar member (typically a member within a cohort with computing resource utilization considered good/acceptable, and achievable, within the business context) is used to describe the boundaries of acceptable use for other members in the cohort. The exemplar member may be selected automatically by the cohort management services 324 using selection criteria and the ordered listing of members, or manually via the cohort and profile manager 314 using a graphical user interface via which a user may be presented with the ordered list of members and may select an exemplar member from the listing.

Similarly, a counter-exemplar member may be selected in a similar manner, either automatically or manually. The counter-exemplar member of a cohort is preferably selected from members within a cohort that are not being used within the business context, e.g., computer resource utilization information being in a "red" category, are used to describe the boundaries of non-use for other members in the cohort. Such a counter-exemplar defines the 'noise floor' of the cohort, i.e. the maximum amount of background or baseline activity to be considered as "non-use". In the case of RAM, for example, the counter-exemplar defines the amount of RAM required to load the OS, but not do anything else.

The exemplar and counter-exemplary members of the cohort may be used as a basis for setting the boundaries in the profile 600 corresponding to the cohort, e.g., the criteria 650 for determining when to adjust membership in the corresponding cohort and corresponding actions 655 associated with these adjustment criteria. Thus, for example, based on the particular utilization information that is of importance to a particular cohort, a statistical representation of the actual utilization information gathered for the members of the cohort may be generated, e.g., a distribution, normalization curve, or other statistical representation of the utilization information for the metrics of interest may be generated for the cohort. This statistical representation may be based on weightings provided to various elements of the utilization metrics with the weightings being either predetermined or dynamically determined, such as discussed above. Moreover, the statistical representation may be generated based on utilization information obtained over specific time periods and thus, the statistical representation may represent a trend of computing resource utilization behavior within the cohort over time.

The resulting statistical representation may be analyzed by the cohort management services 324 to automatically identify an exemplar and counter-exemplar member of the cohort for use in setting the upper and lower bounds of computing resource utilization for consideration of membership in the cohort. Alternatively, or in addition, a graphical output of the statistical representation may be generated and presented to an authorized user via the cohort and profile manager 314 so that the authorized user may select the exemplary and counter-exemplar members or override an automatic selection made by the cohort management services 324.

In addition, the generation of the statistical representation of resource utilization information and its analysis performed by the cohort management services 324 may be used as a way of comparing cohorts to one another. That is the trends (patterns) and statistical representations of one cohort may be compared to those of other cohorts to determine which cohorts have similar resource utilization trends. These similar cohorts may be logically connected within the cohort management services 324 so that when cohort membership needs to be modified, logically connected cohorts may be checked first to determine if a member of one cohort should be transferred to a logically connected cohort. In this way, a type of "linked list" approach may be used to search for a new cohort into which to transfer a member being evicted from a first cohort by searching those that are directly logically linked to the first cohort first, and then continuing the search to those cohorts logically linked to the cohorts directly linked to the first cohort, and so on. Such cohort reassignment could be done on the basis of cost and/or value, especially when cohorts with similar utilization patterns or trends have significantly different costs.

The statistical representations or other analysis of the resource utilization information may further be used to determine members of a cohort that are outliers and should be ejected from the cohort. That is, members of a cohort that have scores or computer resource utilization information indicating that they are significantly different from the exemplar or counter-exemplar member of a cohort (where significantly different may be determined based on predetermined threshold values, for example), may be identified as outliers and candidates for eviction from the cohort. Eviction causes the member to no longer be associated with the cohort, and thus not included in future evaluations of the cohort, but further causes the member to be associated with another more appropriate cohort via a market maker mechanism as described hereafter. Essentially, eviction causes the current cohort to become a seller of the CEEC or computing resource while other cohorts operate as potential buyers of the CEEC or computing resource. The selection of buyers, sellers, and the use of market forces in a CEEC based market maker mechanism, such as CEEC market maker services 322, will be described in greater detail hereafter.

Figure 8:
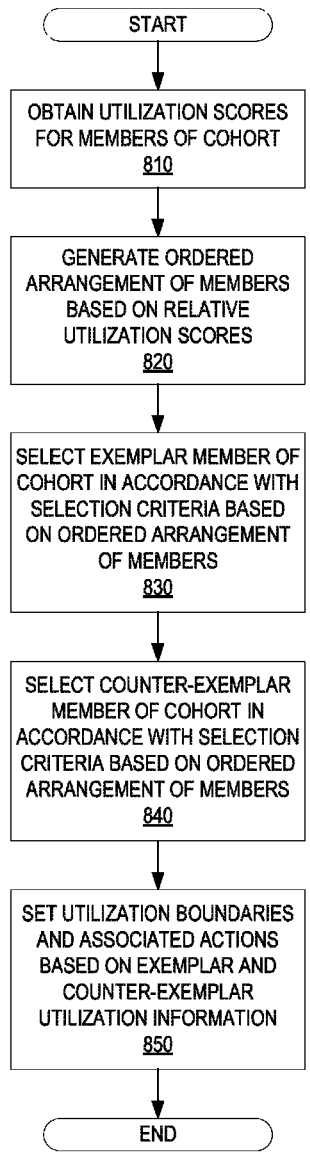
FIG. 8 is a flowchart outlining an example operation for selecting exemplar and counter-exemplar members of a cohort and using this selection to define evaluation criteria and associated actions in profiles in accordance with one illustrative embodiment.

FIG. 8 is a flowchart outlining an example operation for selecting exemplar and counter-exemplar members of a cohort and using this selection to define evaluation criteria and associated actions in profiles in accordance with one illustrative embodiment. The operation outlined in FIG. 8 may be implemented by utilization scoring services 326 in conjunction with cohort management services 324, for example.

As shown in FIG. 8, the operation starts with obtaining utilization scores for members of a cohort, where these members may be computing resources or CEECs (step 810). An ordered list or other ordered arrangement of the members of the cohort is generated, ordered according to the scores associated with the members (step 820). An exemplar member of the cohort is selected from the ordered arrangement of members based on exemplar selection criteria, e.g., mean, closest to an average score, or the like (step 830). A counter-exemplar member of the cohort is selected from the ordered arrangement of members based on counter-exemplar selection criteria, e.g., score that is furthest from a mean, a greatest or lowest score, or the like (step 840). Utilization boundaries, e.g., thresholds and utilization ranges or score ranges, and associated actions for the cohort are set based on utilization metrics of the exemplar member (step 850). The operation then terminates.

Computing Resource Reservation Based on CEECs and Cohort Associations

Based on the established cohorts and their associations, various ones of the computing resources of the cohorts are reserved for use by contracting parties of the CEECs in the CEEC cohorts associated with the computing resource cohorts. The CEEC based reservation service 328 comprises logic for performing such reservations within the organization or enterprise systems and to remove reservations on computing resources, such as part of a transaction settlement phase of a transaction, as described hereafter. Such reservations may comprise generating user accounts, migrating user accounts, generating requisition tickets for requisitioning computing resources, e.g., laptop computers, desktop computers, or the like, to contracting parties, generating reclamation tickets for reclaiming computing resources from contracting parties, e.g., reclaiming a non-used or under-utilized laptop computer, desktop computer, or the like, from a contracting party, or the like.

Reservation of computing resources may further comprise monitoring a total amount of computing resources of a computing resource cohort that are subject to entitlements specified in CEECs of CEEC cohorts associated with the computing resource cohort to determine if and how much of the computing resources are available for reservation by other CEECs of the same or different CEEC cohorts. For example, a determination may be made that currently, the CEECs of the CEEC cohorts associated with the computing resource cohort represent 90% of the CPU computing resources of the computing resource cohort having been reserved. Based on established computing resource reservation thresholds, this amount of reserved computing resources may be compared to the thresholds to determine if additional CEECs may be accommodated or not and such determinations may be used when determining cohort management operations, e.g., associating CEECs with cohorts, computing resources with cohorts, migrating CEECS between cohorts, and the like. Furthermore, such comparisons to threshold may be used as a way of generating alerts or notifications to a system administrator or other authorized user of the need to add additional computing resources to the organization or enterprise systems so as to increase the amount of available computing resources that can be used to associated with CEECs.

Thus, based on the generation of CEECs, the generation of profiles, the generation of cohorts based on these profiles, and the association of CEEC cohorts with computing resource cohorts, computing resources may be reserved for use by contracting parties of these CEECs. Moreover, determinations may be made as to whether sufficient computing resources are available to support associations of CEECs with computing resources of cohorts, whether migration of CEECs is appropriate, and/or whether to notify system administrators or other authorized individuals of needs to add additional computing resources to support CEECs of CEEC cohorts and where such additions, i.e. what computing resource cohorts, are appropriate.

In addition, when computing resources are no longer associated with particular CEECs, the reservations of these computing resources by the CEECs may be removed. In some instances, where CEECs are migrated from computing resources that need to be decommissioned, the CEEC based reservation service 328 may generate and issue work tickets or notifications for a system administrator or other authorized user to actually remove the computing resources from a useful state in the organization/enterprise, which in the case of physical hardware devices may require reconfiguring the organization/enterprise system to remove the physical hardware device, physically decoupling the hardware device, removal, and disposal of the physical hardware devices. This may be the case, for example, in scenarios where CEECs are migrated from older, potentially obsolete, computing resources that are not being utilized, are being under-utilized, or are being utilized for different purposes than they were intended to be used for as specified in the CEECs, and the CEECs are being migrated to newer, potentially more efficient, computing resources.

Determining CEEC Compliance

With the mechanisms described above, the CEEC based market maker system 300 of the illustrative embodiments may determine when computing resources are being used by contracting parties in compliance with the CEECs associated with these contracting parties. In particular, the logic provided in the CEEC based market maker system 300 may operate on CEEC cohorts to determine if the terms of the CEECs in the CEEC cohort are being satisfied by the contracting parties' utilization of the computing resources in the computing resource cohort(s) associated with those CEECs. The computing resource utilization metric information, obtained from the information technology monitoring systems 350 and stored in the database system 330, as well as scoring information obtained from the utilization scoring services 326, may be used to determine if those computing resources in the computing resource cohorts are being used in such a way as to meet the prescribed usage requirements specified in the CEECs of the CEEC cohort.

As an example, assume, for simplicity of the present example, that a CEEC cohort is comprised of a single CEEC and this CEEC cohort is associated with a single computing resource cohort comprising a plurality of computing resources. The association between CEEC cohort and computing resource cohorts may be performed in accordance with the mechanisms as discussed above. Periodically, continuously, or in response to an event, such as system administrator or authorized user requesting CEEC compliance determinations, a CEEC compliance operation may be performed by the CEEC manager 318 on CEECs identified in the CEEC database 334. As a result of the CEEC compliance operation, a compliance report may be generated and output to a system administrator or other authorized user and adjustment of CEEC cohorts may be initiated.

The CEEC compliance operation may, for the CEEC of the CEEC cohort (or each CEEC in a CEEC cohort in examples where there are multiple CEECs in a CEEC cohort), determine the minimum utilization requirements specified in the terms and conditions of the CEEC, e.g., 50% of the average CPU usage per day is directed to the running of accounting software. Based on the profile associated with the CEEC cohort, the CEEC compliance operation may obtain computing resource utilization information from computing resource metric information collected for the specific computing resources of the computing resource cohort(s) with which the CEEC cohort is associated. For example, if the CEEC cohort is associated with a computing resource cohort corresponding to processors of a particular type, number of cores, speed, or and the like, as may be specified in the profile of the CEEC cohort, and the profile of the CEEC cohort indicates that resource utilization evaluation should be performed with regard to peak numbers of processor cycles per minute, then the computing resource information may be determined based on collected processor peak number of cycles per minute information collected for the processors in the computing resource cohort. This information may be correlated with information indicative of what processes were being executed during these peak number of cycles. From this it can be approximated how much time and how many processor cycles of the computing resources were devoted to executing various processes.

The specificity of this scrutiny can be varied depending on the cost of the CEEC. For example, the most expensive CEECs can be evaluated at this process level, while the least expensive CEECs can be measured more simply on the basis of average general utilization. In the latter case the compliance check is simply to determine if the weighted combined utilization score is above a threshold. Any degree of specificity between the two extremes can be supported.

Based on this computing resource utilization information, and evaluation criteria specified in the profile of the CEEC cohort, a determination is made as to whether at least 50% of the of the CPU usage over per day is directed to the running of accounting software. Thus, for example, from the computing resource utilization information, the total peak number of cycles that were devoted to running accounting software processes as opposed to other types of processes may be determined. From this, an average or other evaluation criteria specified value may be generated over the specified period of time, e.g., a day. This value may then be compared to the minimum requirement specified in the terms and conditions of the CEEC to determine if the CEEC is being complied with by the contracting party's usage of the computing resources in the computing resource cohort with which the CEEC is associated.

Compliance may be determined based on a strict or flexible compliance standard. Strict compliance requires that the specific terms in the CEEC be met or else it is determined that the CEEC is not being complied with. Flexible compliance allows for a tolerance around the terms of the CEEC which will still be considered to be in compliance with the CEEC but may be flagged for additional monitoring, for example. Thus, if a CEEC is flagged for additional monitoring, events for initiated CEEC compliance operations may be scheduled at an increased frequency, for example. Based on the determination of compliance with the CEEC terms and conditions, whether strict or flexible, a representation of the degree of compliance may be generated and used as a basis, along with actions defined in the profile associated with the profile of the CEEC cohort, to determine appropriate actions to be performed. For example, as previously mentioned above, a graphical representation may be generated, such as a multi-axis graph or the like, that identifies, such as by color code or the like, whether the CEEC is being complied with, is within a tolerance of strict compliance but needs to be further monitored, or is not being complied with. This graphical representation may be output to a system administrator or other authorized user so that they can make decisions regarding how to modify CEECs, associations of cohorts, and the like, to achieve the business goals of the organization or enterprise.

This can also be governed by the willingness and/or capability of the enterprise to handle migrations. For example, if the enterprise can only move 100 CEECs a month, there is little point in identifying 10,000 CEECs. Thus, thresholds be defined initially as 'loose', so that only the least compliant CEECs are identified, and then may be defined tighter as progress is made.

Moreover, the actions specified in the profile for the CEEC cohort corresponding to the various degrees of compliance may be automatically initiated using the CEEC market maker services 322. These actions may be, for example, sell, hold, or eliminate, for example. For example, if a degree of compliance shows that the CEEC is being complied with or is within a tolerance of strict compliance, then a hold action may be performed where nothing is done regarding the migration of the CEEC and thus, the CEEC remains part of the CEEC cohort and the CEEC cohort remains associated with the one or more computing resource cohort(s). If the degree of compliance shows that the CEEC is not being complied with, but there is some utilization under the CEEC terms, then a sell action may be initiated to cause the CEEC to be negated and replaced with a new CEEC with new terms corresponding to the actual utilization, and/or the CEEC or the replacement CEEC is migrated to another one or more computing resource cohort(s). If the degree of compliance shows that there is no utilization with regard to the terms of the CEEC, then the action may be to eliminate the CEEC without replacement of the CEEC.

It should be appreciated that similar compliance determinations may be made with regard to compliance of computing resource utilization with utilization requirements specified in profiles defining the computing resource cohorts. Such compliance determinations are typically made to determine if a computing resource cohort's utilization is indicative of the cohort having sufficient available resources to warrant "buying" additional CEECs, the cohort resources are sufficiently utilized to warrant "selling" CEECs to another computing resource cohort, or cohort resources are being utilized at an efficient level such that no changes should be made, i.e. a "hold" action should be performed. Thus, computing resource cohorts may be designated as buyers or sellers in the CEEC market with the unit of commerce in the CEEC market being CEECs, i.e. computing resource cohorts are either buyers or sellers of CEECs and the determination of whether they are buyers or sellers may be based on computing resource utilization analysis and compliance with CEEC terms and conditions.

The particular actions identified via the CEEC compliance operation may be performed via the CEEC market maker services 322 using the transaction builder 312. That is, a transaction may be created for buying or selling a CEEC. The CEEC market maker services 322 may process the transaction by pairing buyers and sellers in accordance with rules and parameters specified in the CEEC market maker services 322 for achieving the business objectives of the organization or enterprise. These rules or parameters, along with the evaluation criteria and CEEC compliance determinations, essentially define market forces for migrating and associating CEECs, via CEEC cohorts, with computing resources, via computing resource cohorts. The actual operation of the CEEC market maker services 322 will be described in greater detail hereafter.

Figure 9:
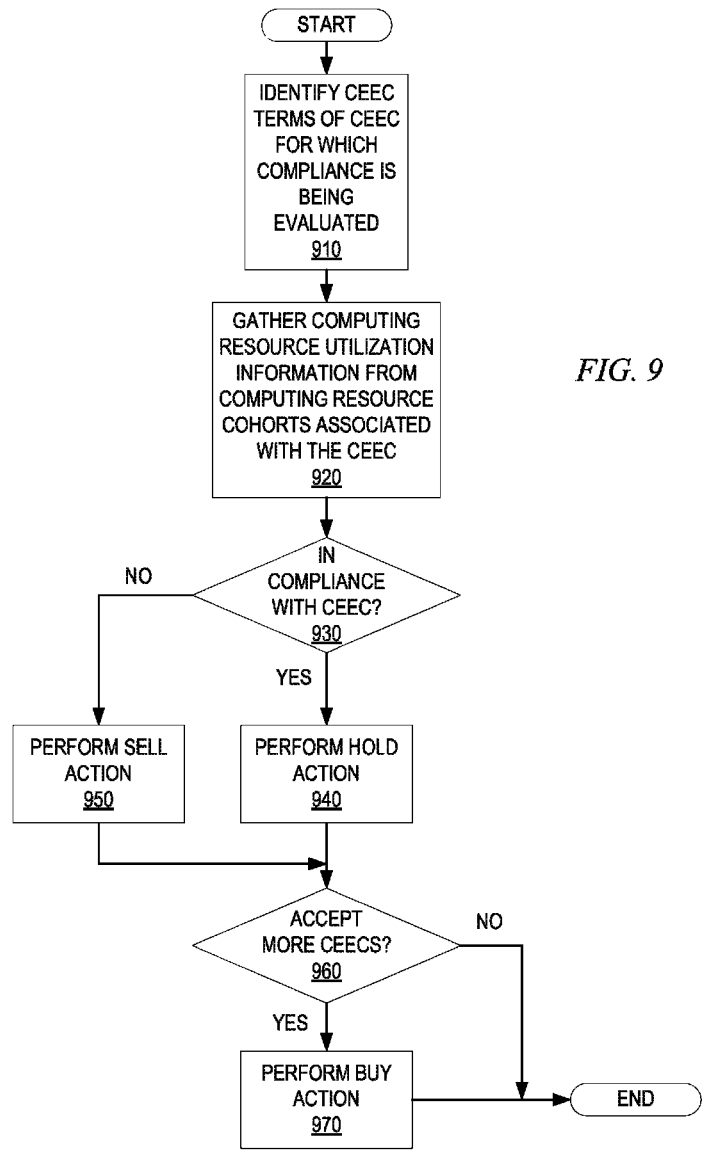
FIG. 9 is a flowchart outlining an example operation for evaluating CEEC compliance in accordance with one illustrative embodiment.

FIG. 9 is a flowchart outlining an example operation for evaluating CEEC compliance in accordance with one illustrative embodiment. As shown in FIG. 9, the operation starts with the identification of CEEC terms for a CEEC for which compliance is being evaluated (step 910). Computing resource utilization information is gathered from computing resource cohort(s) with which the CEEC is associated (step 920). A determination is made as to whether the computing resource utilization information indicates that the computing resources are being used in compliance with the terms of the CEEC (step 930). If so, then a "hold" action is performed such that no change in the CEEC cohort or the computing resource cohort(s) is performed (step 940). If the computing resource utilization information indicates that the CEEC terms are not being complied with, then a "sell" action may be performed such that the computing resource cohort(s) corresponding to the CEEC cohort become sellers of the CEEC in a CEEC market maker system (step 950). If the computing resource utilization information indicates that the computing resource cohort(s) have sufficient resources to accept additional CEECs (step 960), then these computing resource cohort(s) may become buyers in the CEEC market maker system (step 970). The operation then terminates.

Thus, via the CEEC compliance operation, a determination can be made as to whether CEEC terms are being satisfied, not only by the computing resource provider providing the required resources under the CEEC, but also that the contracting party is utilizing the computing resources in compliance with the terms of the CEEC. If the CEEC terms are not being satisfied by the contracting party, then the CEEC may be migrated to other computing resource cohort(s), negated and replaced with a new CEEC in the same or different CEEC cohort in association with the same of different computing resource cohort(s), or simply eliminated and not replaced if desirable. This in effect enforces the terms of the CEEC on the computing resources and the contracting party.

Negated CEECs are not all equal. This is why it is important that they can be priced so that the CEECs that cost the most, are worth the most, or that offer the easiest savings can be prioritized by the enterprise.

Additionally, the enterprise, via the CEEC market maker, described hereafter, has the ability to negate CEECs on any other basis to serve its short or long term objectives. Such negation overrides any automated CEEC compliance evaluation. Thus, an enterprise can negate the CEECs of systems in a particular data center for no reason other than that they want to terminate the lease on that data center and migrate all workload elsewhere, for example.

CEEC Market Maker Services

CEEC market making in general refers to bringing together buyers and sellers of CEECs in an environment where they would have difficulty finding each other unassisted. The CEEC market maker services 322 are mechanisms that bring the buyer computing resource cohorts together with the seller computing resource cohorts and facilitate a transaction for migrating a CEEC from the seller computing resource cohorts to the buyer computing resource cohorts, either via re-association of an existing CEEC from the seller to the buyer, or the negating of the CEEC on a seller and replacement of the CEEC with a new CEEC associated with the buyer. In some cases, the CEEC market maker services go beyond simply matching a buyer with a seller for a synchronous transaction where both buyer and seller of the CEEC are known at the time of the transaction, but instead the CEEC market maker may provide the capability for asynchronous transactions in which one side (buyer or seller) of the transaction is known and the other side (the other of buyer or seller) is found using specified criteria, or where the buyer is associated with a planned purchase, not yet on hand.

The transactions for associating buyers and sellers in the CEEC market maker services not only facilitate the transfer of CEECs so that terms of the CEEC may be satisfied or new CEECs that more closely match actual utilization under a previous CEEC are created and associated with computing resource cohorts, but also operate to satisfy business objectives for the organization or enterprise. That is the organization or enterprise may set forth rules and parameters for guiding the way in which the CEEC market maker services 322 operate to achieve a specific objective. Examples of such objectives may include, for example, achieving a specific energy savings target, selling all of the CEECs associated with a given location of the organization in order to vacate the location, building a business case with a specified target dollar amount for the purchase of new hardware, driving utilization of the highest value assets (computing resources) to a target utilization, determining a cheapest place to locate a new computing resource (e.g., piece of hardware or software), locating a place for a new computing resource that will have a maximum cost reduction, creating a prioritized list of migrations of CEECs based on estimated value of the migration, or the like.

The basic objective of the CEEC market maker services 322 is for the migration of CEECs, and thus their associated workloads, from migration sources, e.g., out-dated hardware/software, under-utilized hardware/software, etc. (Sellers) to migration sinks, e.g., new hardware/software, virtualization hosts, etc. (Buyers), so as to achieve the desired objective. Cohorts may be specified as buyers or sellers within this CEEC market either in response to CEEC compliance operation results, or by independent identification by the CEEC market maker services 322 of potential buyers and sellers based on the desired objective and one or more trade specifications generated for achieving these desired objectives. The migration is facilitated by way of transactions upon which the CEEC market maker services 322 operate. Transactions may be generated automatically, semi-automatically, or manually via a transaction builder 312.

There are four phases to a transaction's life cycle within the CEEC market maker system 322, i.e. creation, assembly, initiation, and settlement. During the creation phase, a transaction record is created either from scratch or from a pre-existing trade specification using the transaction builder 312. The author of the transaction, which can be a human user or an automated process, creates or selects specifications for buyers and sellers via the transaction builder 312, e.g., CEEC terms for sellers, configuration requirements for buyer computing resources or cohorts, etc., e.g., these selected specifications may include what operating system is being executed on the computing resources, what type of processors, a quantity of processors, an amount of memory resources, a business purpose of the CEEC, an organization department associated with the CEEC, or any other identifiable parameter of a computing resource or CEEC. The selection may be performed by having an authorized user input the various specification parameters into user interface elements of the transaction builder 312, selecting these specification parameters from a listing of potential specification parameters, or the like.

During an assembly phase of the transaction, the transaction author or the automated CEEC market maker services 322 use the specifications to select the specific seller and buyer computing resource cohorts in the organization or enterprise system. For example, sellers may be selected from a set of computing resource cohorts that have indicated their desire to be sellers as a consequence of the results of a CEEC compliance operation indicating a need to sell a CEEC. Alternatively, sellers may be selected in accordance with the specified business objectives by selecting computing resource cohorts to be sellers regardless of whether or not they have indicated a desire to be sellers. Still further, sellers may be selected using a combination of these two approaches.

Similarly, buyers may be selected from a set of computing resource cohorts that have indicated their desire to be buyers. Such an indication may be made in response to a determination that a computing resource cohort is under-utilized and has capacity to accept additional CEECs. Alternatively, buyers may be selected in accordance with the specified business objective by selecting computing resource cohorts to be buyers regardless of whether or not they have indicated a desire to be buyers. Still further, buyers may be selected using a combination of these approaches.

In the case of sellers and buyers being identified through available computing resource capacity in computing resource cohorts and/or non-compliance with CEEC terms as determined through a CEEC compliance operation, the CEEC market serves as a way of migrating CEECs to computing resource cohorts that have a greater likelihood to be utilized in a way that satisfies the CEECs being migrated. As mentioned above, this migration may, in some cases, result in the negation of the original CEEC being migrated and the creation of a new CEEC in association with a CEEC cohort associated with computing resource cohort(s) capable of providing the computing resources under the new CEEC. This new CEEC may have different utilization requirements from the original CEEC based on the actual measured utilization of the CEEC by the contracting party. Thus, for example, if under a first CEEC the contracting party was required to use the computing resources at a first level of X and a first pattern of intensity of an average of Y usage per week, but instead the measured utilization indicated a level of Z utilization with a second pattern of intensity of an average of W usage per week, then the original CEEC may be negated and a new CEEC may be created that requires Z utilization with a pattern of intensity being an average of W usage per week. This new CEEC may be added as a member of a CEEC cohort associated with a computing resource cohort that can satisfy the terms of the new CEEC. In this context, the original computing resource cohort associated with the original CEEC cohort is a seller of the original CEEC and the computing resource cohort associated with the new CEEC cohort is a buyer of the new CEEC within the CEEC market.

In the case of sellers and buyers being selected based on the business objectives regardless of an indication by the cohorts of a desire to be buyers/sellers, the business objective may be identified and corresponding computing resource cohorts having characteristics meeting these business objectives are selected. This may include analyzing computing resource utilization information, configuration information, CEEC cohort association information, and the like, to determine which computing resource cohorts have characteristics meeting the criteria specified in the business objectives. As one example, if the business objective is to move CEECs and their associated workloads from desktop computing devices to virtual machines or servers, then computing resource cohorts comprising desktop computing devices may be identified based on configuration information associated with the computing resources of a computing resource cohort. These computing resource cohorts may be selected as sellers of CEECs within the CEEC market. Similarly, computing resource cohorts having configuration information indicative of server computing devices having virtual server software mechanisms may be identified and selected as buyers of CEECs within the CEEC market.

During the assembly phase, selected sellers and buyers both signal acceptance or rejection of the transaction. This makes the selected sellers and buyers "candidate" buyers and sellers that have not yet been confirmed, as the trade can be settled at some time in the future. Buyers and sellers may be unable to meet their obligations at settlement time through no fault of their own, however. The assembly phase is not complete until there are enough sellers and buyers to meet the objectives of the transaction. Thus, for example, if the business objective of the transaction is to migrate CEECs and their workloads from all computing resources associated with site A of the organization, the assembly phase of the transaction is not complete until all of the computing resource cohorts associated with site A have been identified as sellers of CEECs and sufficient computing resource cohorts at other sites have been identified as buyers of the CEECs to enable migration of all of the CEEC cohorts associated with site A to these other sites.

The initiation phase of the transaction is performed in response to a determination that there are sufficient buyers and sellers to satisfy the business organization of the transaction and the results of completion of the transaction are determined to be satisfactory. The determination of whether a transaction completion result is satisfactory or not may be done automatically by comparing a metric of the completion to one or more predetermined thresholds. For example, costs and values may be associated with various aspects of the transaction and these costs and values may be calculated with regard to the specific selected buyers and sellers to determine an actual cost/value metric for the transaction. This cost/value metric for the transaction may then be compared against one or more thresholds to determine if the cost/value of the transaction is indicative of a sufficient benefit to the organization/enterprise such that the transaction should be completed.

Assuming that the cost/value metric indicates a desirability to complete the transaction, operations needed to facilitate the migration of CEECs from sellers to buyers are initiated. These operations may include, for example, performing various resource reservations using the CEEC based resource reservation services 328 in FIG. 3, for example. The operations may also comprise, for example, operations to prepare workload migration under the CEEC including the elimination of any non-essential storage, creation of an OS instance container on the buyer system, or the like. Once these operations are executed, the buyers and sellers cease to be candidates and are now formally obligated to fulfill the requirements of the trades between buyers and sellers that together satisfy the transaction. Timers for any time-limited obligations under the trades may be started and monitored to ensure proper settlement of the transaction.

Once the trades are initiated, actions are initiated to perform the actual trades between buyers and sellers until the transaction is settled, i.e. all trades are completed successfully. During this process, the transaction is said to be in a settlement phase. During this settlement phase, individual CEECs may be nullified, created, and modified on an individual basis as necessary to perform the various actions needed to perform the trades. For example, a CEEC may be nullified on a CEEC cohort associated with a seller computing resource cohort and a new CEEC may be generated and associated with a CEEC cohort associated with the buyer computing resource cohort. As another example, the CEEC's association with a CEEC cohort may be modified in the CEEC to point to a different CEEC cohort, i.e. the CEEC is modified so that an identifier of the original CEEC cohort associated with a seller computing resource cohort is overwritten with an identifier pointing to a CEEC cohort associated with the buyer computing resource cohort.

Before a trade is made under a transaction specification, cost versus value (cost/value) of the trade may be determined and used as a basis for determining whether to actually perform the trade or not, and how to prioritize it with regard to other trades in progress. The costs/values may be determined in accordance with the costs attributes specified in the transaction specification. That is, the transaction specification may specify for both the buyer and seller, the cost attributes that are of interest in determining whether the cost versus value of a trade is such that the trade should be performed. These costs and values need not be specified as monetary units but may be any unit suitable for comparison between buyers and sellers. If the value of the trade is greater than the cost by a threshold amount, where the threshold may be predetermined or specified in the transaction specification, then the trade should be allowed to happen; otherwise the trade should be canceled.

The actual cost calculation may be performed based on computing resource utilization metric information for the buyers and sellers with regard to the computing resources and supporting infrastructure that have been used on the seller to perform workloads under the CEECs that are going to be traded and the expected computing resources that will need to be used on the buyer to perform such workloads under the CEECs or replacement CEECs. The seller cost information may be obtained from the database system 330 whereas the cost information for the buyer may be based on configuration information from the database system 330 and a prediction mechanism that predicts, based on the configuration information for the buyer, and the measured utilization of the workloads associated with the CEECs, what the cost will be on the buyer computing resources cohort. These operations may be performed within logic of the CEEC market maker services 322, for example, when determining to initiate a transaction under a transaction specification provided by the transaction builder 312.

The particular costing framework used to evaluate trades may take many different forms but in general will take into account fixed asset costs, infrastructure costs, hardware resource allocation costs, and software instance costs. Fixed asset costs are the costs to provide the hardware platform to the software instances, regardless of how many or few software instances are hosted. That is, the test to determine if the cost should be encapsulated in this variable is the degree to which it must be borne regardless of software instances. Hardware resource allocation costs are the percentage of the hardware costs that should be charged to a given software instance, based on its size (and therefore its use of the hardware on a percentage basis). The software instance costs are the costs of a specific software instance. When migrating off of many older systems onto a newer, more dense system, there is an easily calculable difference in the amount of floor space required, the amount of wattage consumed, and the amount of cooling required. When migrating to a pre-existing buyer, this difference is even greater.

As mentioned above, it may be the case that when a transaction reaches the settlement phase, the particular parties (buyer and sellers) that have been associated with one another to perform trades under the transaction cannot meet their obligations, e.g., resources that were available at the initialization of the transaction are not available now. In such cases, the organization/enterprise as a whole may maintain reserve computing resources, which may be organized into one or more computing resource cohorts, that may be used to permit settlement to complete. However, these reserve computing resources need to be reacquired over time so that they may be used to assist in the settlement of future transactions if need be. Thus, the CEEC marker maker services 322 may generate a schedule for migrating the CEECs and workloads from these reserve computing resources to buyer computing resource cohorts, where this schedule provides time frames at which the reserve computing resources, or at least portions of them, indicate a desire to be a seller of a CEEC, or portion of a CEEC, within the CEEC market. This schedule may be accelerated as time goes on such that the selling is more frequent as the time that the reserve computing resources have been used to facilitate a CEEC increases.

Additionally, the CEEC market maker services 322 reserves may be balanced in favor of those elements that buyers may find constrained, such as storage. In such a case, the transaction splits out the storage separately, trading the reserve resources on margin, while the rest of the transaction goes forward normally.

Thus, the reserve computing resources of the CEEC based computing resource management system 300 allows parties in a transaction to be made whole even if their counter-party fails to meet their obligations. This is another case where it is important to recognize that the CEEC market maker services 322 do not operate as just a neutral party making connections but instead is the manifestation of the "will of the enterprise," and it has the wherewithal of the enterprise to make sure that the enterprise's business objectives are achieved.

FIGS. 10A-10D are example diagrams illustrating the various phases of a transaction for one example CEEC market maker based scenario in accordance with one illustrative embodiment. In the depicted example, a transaction specification 1014 is generated for moving CEECs from secondary use desktops, i.e. desktops that are not the primary computing resources for the contracting parties, to virtual machines on one or more shared server computing devices, a virtualization cluster, or the like. That is, the transaction specification 1014 is used to move CEECs, and their associated workloads, from physical computing devices to virtual computing devices in a virtualization environment. The transaction specification 1014 may be predefined and already stored in association with the transaction builder 1012 or may be generated from scratch via user interfaces provided by the transaction builder and user input 1010 received from an authorized user. In the case where the transaction specification is predefined, the user input 1010 may be a selection of the predefined transaction specification from a store of transaction specifications associated with the transaction builder 1012, such as via a listing in a user interface provide by the transaction builder 1012. Pre-existing transaction templates allow enterprises to easily replicate transactions that must be done over and over where the number of sellers exceeds the capacity to handle migrations at one time.

The selection or creation of the transaction specification 1014 is performed using the transaction builder 1012 during a creation phase of the transaction. In addition, the transaction specification 1014 is provided to the CEEC market maker services 1016 which generates one or more trade instances 1018 from the transaction specification. The trade instances 1018 are instances of the transaction specification that are used to perform trades between at least one seller and at least one buyer, where the sellers and buyers are computing resource cohorts. In the depicted example, the trade specification 1016 is used by the CEEC market maker services 1016 to create a trade instance 1018 for tracing CEECs for 50 specific desktops being used as secondary workstations for a CEEC for 50 virtual machines (VMs) on a specific virtualization cluster, which is comprised of multiple computing resources. This trade instance 1018 is used by the CEEC market maker services 1016 to find CEECs, such as CEEC instances corresponding to CEEC specification 1022 for sellers and CEECs, such as CEEC instances corresponding to CEEC specification 1032 for buyers that meet the criteria of the trade instance.

It should be appreciated that while only a single seller CEEC specification 1022 and a single buyer CEEC specification 1032 are shown in FIGS. 10A-10D, in actuality multiple buyer and seller CEEC specifications and/or CEEC instances generated from these CEEC specifications 1022, 1032 may be utilized to satisfy the trade instance 1018 and the transaction as a whole. For example, in the depicted example, 50 seller CEEC instances corresponding to the CEEC specification 1022 may be utilized, one for each of the desktops, and 1 buyer CEEC instance corresponding to the CEEC specification 1032 may be used to represent the buyer virtualization cluster that is buying all 50 of the seller CEEC instances.

Figure 10A:
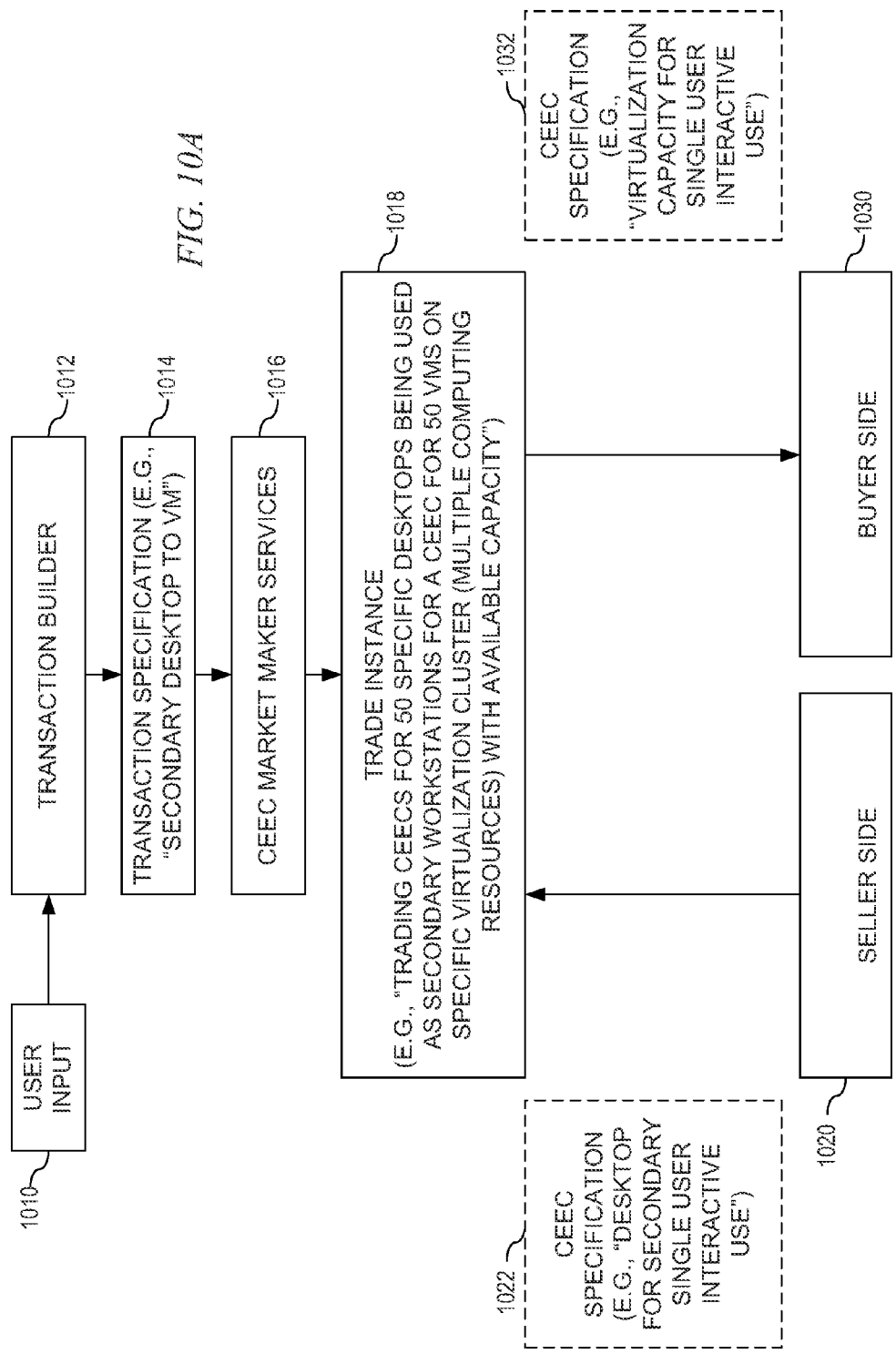
FIGS. 10A-10D are example diagrams illustrating the various phases of a transaction for one example CEEC market maker based scenario in accordance with one illustrative embodiment.
Figure 10B:
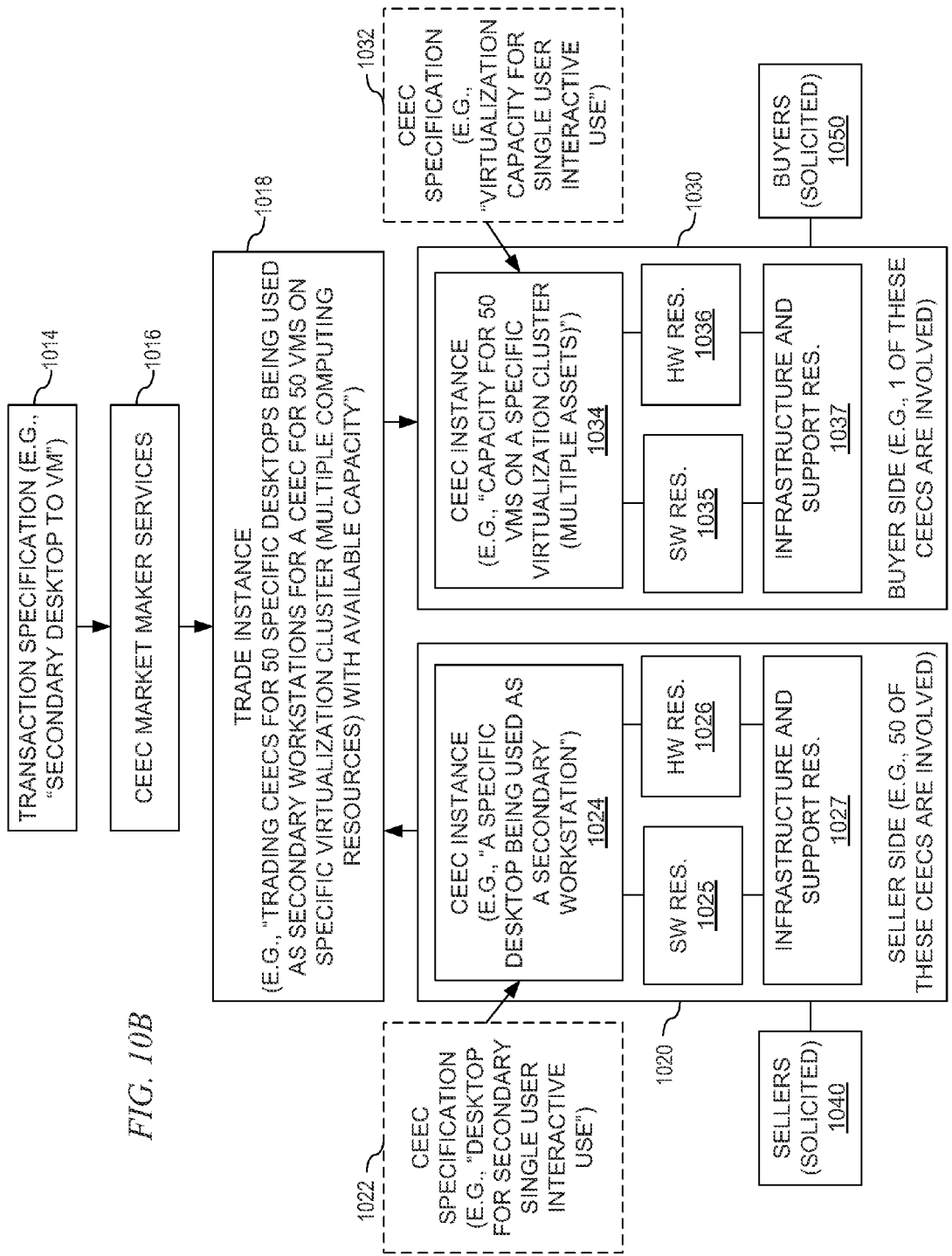

Following the creation of the transaction as shown in FIG. 10A, the transaction proceeds to an assembly phase, as shown in FIG. 10B. As shown, in the assembly phase, specific CEEC instances 1024 and 1034 associated with the seller and buyer sides 1020 and 1030, respectively, of the transaction are identified. The identification may be performed, for example, by the CEEC market maker services 1016 based on the transaction specification 1014 and trade instance 1018 by identifying seller side 1020 CEEC instances 1024 that satisfy at least a portion of the seller side requirements of the transaction specification 1014 and trade instance 1018. Moreover, the identification may include identification of buyer side 1030 CEEC instances 1034 that satisfy at least a portion of the buyer side requirements of the transaction specification 1014 and trade instance 1018. These CEEC instances 1024 and 1034 are associated with specific software resources 1025, 1035 and hardware resources 1026, 1036 which themselves have associated infrastructures and support (e.g., human support) resources 1027, 1037.

Figure 10C:
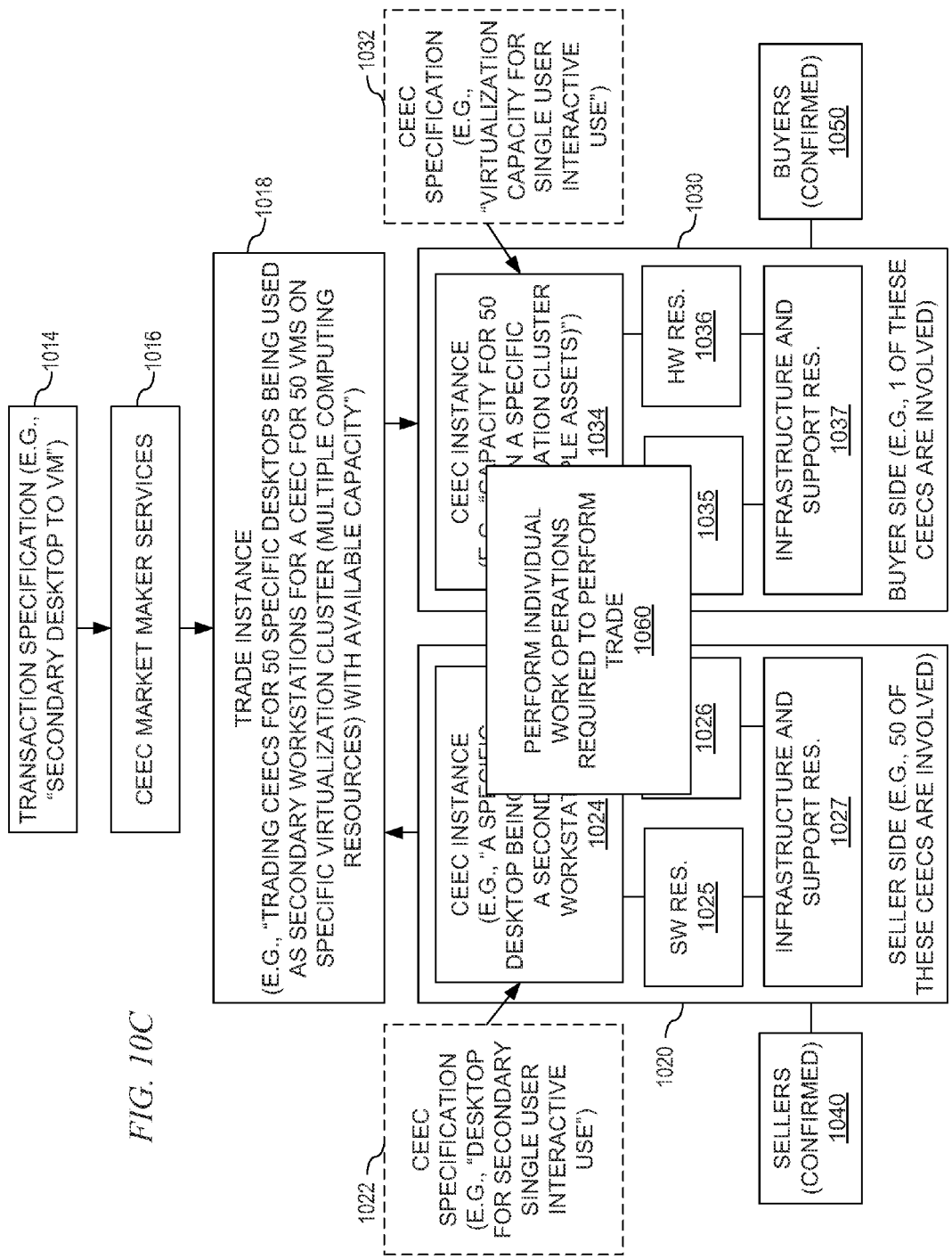

At this phase of the transaction, the actual seller cohorts and buyer cohorts are only considered to have been "solicited" and are only candidate sellers and buyers. There is no requirement or expectation that the seller cohorts and buyer cohorts will actually engage in the trade until they signal back their acceptance or rejection of the trade instance 1018. If a seller/buyer accepts the trade instance 1018, and it is determined that they can settle their portion of the trade instance 1018, then they become confirmed, as is shown in FIG. 10C. If they signal a rejection of the trade instance 1018, then they are removed as candidates for satisfying the trade instance. Thus, in the assembly phase of the transaction, the sellers and buyers for satisfying a trade instance, or trade instances, 1018 of a transaction 1014 are assembled. A determination may be made as to whether there are sufficient sellers and buyers to satisfy the transaction requirements and if not, then the assembly phase may be continued until sufficient numbers of sellers and buyers are identified and accept the trade instance(s) 1018, or if a timeout condition occurs. If a timeout condition occurs, then an error condition may be returned indicating that the transaction could not be completed successfully. This error condition may be notified to an appropriate authorized user, such as via the transaction builder 1012, for example, so that appropriate corrective action may be taken, e.g., modifying the transaction specification, manually selecting sellers and buyers, etc.

Once sufficient sellers and buyers are assembled during the assembly phase of the transaction, the transaction proceeds to the initiation phase as shown in FIG. 10C. During the initiation phase, individual work operations required to perform the trade instance(s) 1018 are initiated 1060. These work operations that are initiated (and which when completed will constitute transaction settlement) may involve, for example, configuring the virtualization infrastructure to provide the 50 VMs, preparing the sellers for migration by uninstalling unnecessary software and removing unnecessary files to make the image as small as possible, snapshotting the sellers and re-establishing them in the virtualization cluster, granting access to the appropriate users, removing all IP from the seller hardware, unplugging/unracking the seller hardware, and removing the seller hardware from the floor.

Figure 10D:
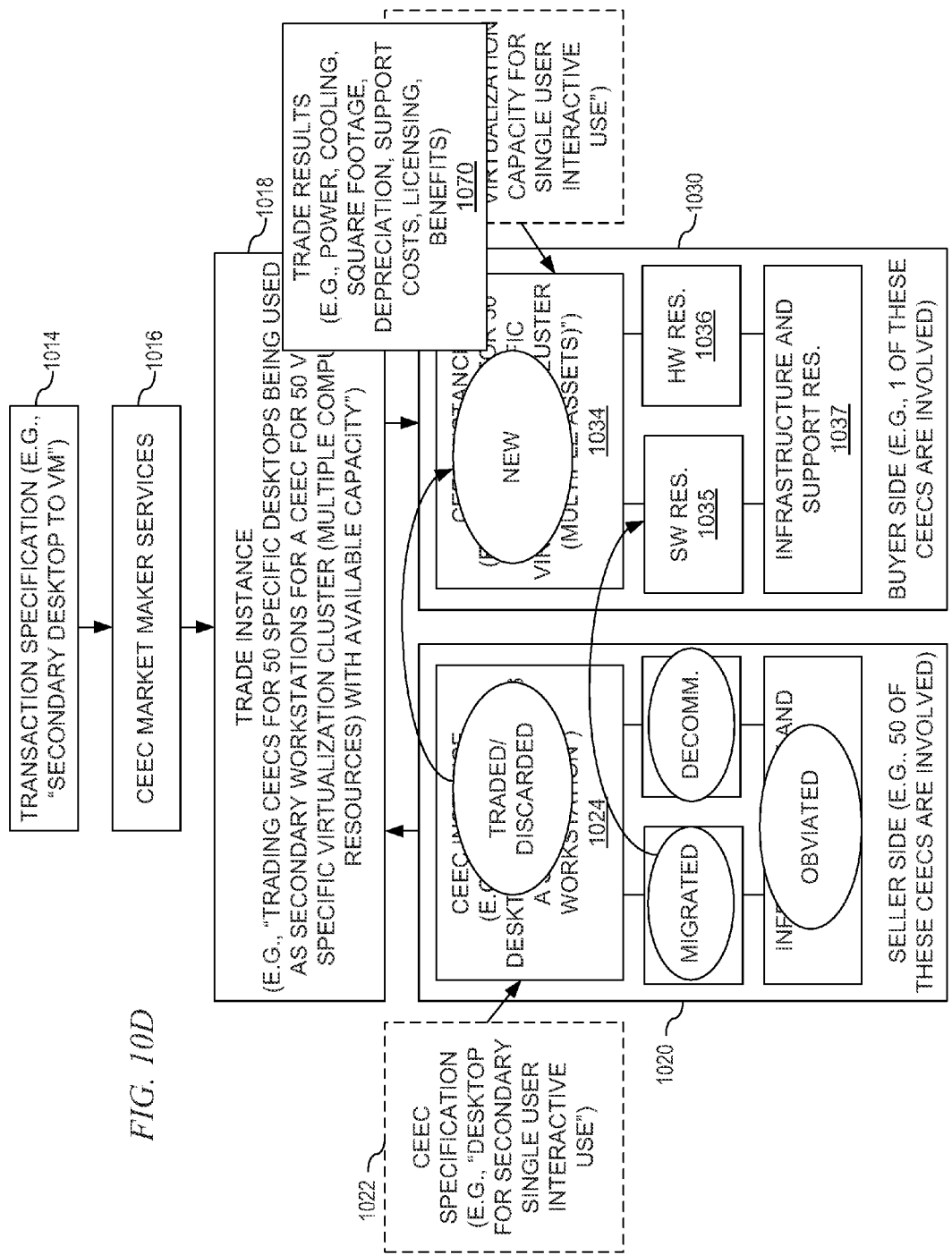

Once the individual work operations are performed 1060, the settlement phase of the transaction is performed as shown in FIG. 10D. During the settlement phase, the seller side 1020 CEEC instances 1024 are traded to the buyer side 1030 or otherwise discarded in exchange for a new CEEC 1034 on the buyer side 1030, e.g., 50 CEEC instances, each for a single desktop computer are traded or discarded and replaced with a single new CEEC instance representing 50 virtual machines on a virtualization cluster. As a result, as part of the settlement phase, software resource license entitlements 1025 of the seller side 1020 that were associated with the traded/discarded CEEC instance(s) 1024 may be migrated to the buyer side 1030. These software resource license entitlements 1025 may be associated with an OS instance, the asset or the person, and which will need to be re-associated correctly in the buyer cohort. The buyer is not expected to have 'licensing capacity', though the market maker is presumed to have licensing liquidity in the event that additional licensing is required when the seller migrates (this can be the case when software is licensed to an asset as a 'pre-load' which cannot be transferred). There is typically a requirement that the hardware resources 1026 on the seller side 1020 be decommissioned since they are no longer utilized by contracting parties to a CEEC instance 1024 and the cessation of their consumption of resources (power, cooling, etc.) is part of the objective of the transaction. Because the software resources 1025 and hardware resources 1026 are migrated and decommissioned, the need for the infrastructure and support resources 1027 is obviated and savings realized are associated with the transaction.

As part of the settlement phase, trade results may be generated to evaluate the results of the trade. These trade results may provide an indication as to costs associated with the previous computing resource allocation as compared to the new computing resource allocation after the trade is completed. Such cost comparisons may be performed with regard to various costing factors including power consumption costs, cooling costs, square footage costs, depreciation costs, support costs, licensing costs, and other costs/benefits. All of these costs, in the depicted example, should be significantly lower for the virtualization cluster as opposed to having 50 desktop computers simply by virtue of the lower number of hardware resources required to support the entitlements of 50 contracting parties. Such cost savings may be reported to the authorized user, such as via the transaction builder 1012 for example, by providing a comparison of costs via a user interface or the like.

As a result of the settlement phase of the transaction, the transaction is completed and the completion can be signaled to the transaction builder 1012 so that an appropriate notification can be generated and output to an authorized user. The notification may include the costs comparison results as discussed above. Workloads may then be managed, routed, and performed in accordance with the new CEEC arrangement, appropriate tickets may be generated for decommissioning hardware resources, support personnel and infrastructure resources may be reassigned, and the like. For example, workloads that would have been previously performed on the 50 desktop computers are now performed using the 50 virtual machine instances on the virtualization cluster and the contracting parties are each given entitlements under the CEEC 1034 to a respective one of the 50 virtual machine instances such that each contracting party is given the same degree of entitlement to the virtual machine instance associated with their portion of the CEEC instance 1034.

FIGS. 11A-11C depict an example diagram of a transaction specification in accordance with one illustrative embodiment. The transaction specification 1100 may be created, for example, by an authorized user via the transaction builder 312. The transaction builder 312 constructs a transaction specification based on inputs form a user which specifies the objectives of the enterprise and the general character of the transaction type. Once a transaction specification is created, however, any number of transaction instances can be created by the transaction builder 312 automatically conforming to the transaction specification. The transaction specification may be provided to the CEEC market maker services 322 to be used in identifying buyers and sellers, determine costs of trades, determine based on these costs whether a trade should be performed within the CEEC market, and perform the trades with the assistance of other services, e.g., the CEEC based reservation service 328, database system 330, or the like.

As shown in FIGS. 11A-11C, in the depicted example, there are five sections to a transaction. A first section 1110 of the transaction specification represents the savings objectives, i.e. what the author of the transaction is trying to achieve in terms of savings. A second section 1120 represents the seller side filters of the transaction, i.e. the filters that should be applied to potential sellers in order to select appropriate sellers for satisfying the business objectives of the transaction. These seller side filters may include architectural, geographical and business unit attributes, target values indicative of when a sufficient number of sellers have been selected, and the like.

A third section 1130 of the transaction specification represents seller side cost attributes. The seller side cost attributes are attributes that represent the cost of running workloads under the current CEECs on the seller side. These are not necessarily monetary costs, but may be specified in terms of computing resource utilization or reservation amounts, for example. As an example, a workload under a current CEEC may "cost" 5 Gigs of RAM, for example. Any cost metrics may be used without departing from the spirit and scope of the illustrative embodiments as long as these costs metrics are able to facilitate a comparison of costs/values between seller and buyer sides of the CEEC market. The mechanisms of the illustrative embodiments have the ability to convert all costs to a monetary unit, but this is not required for the illustrative embodiments to operate.

A fourth section 1140 of the transaction specification represents the buyer side filters. These are the filters that should be applied to the set of potential buyers so as to select appropriate buyers to satisfy the business objectives of the transaction. These filters may include architectural, geographical and business unit attributes, as well as target values indicative of when enough buyers have been selected to satisfy the business objectives of the transaction.

A fifth section 1150 of the transaction specification represents the buyer side costs. The buyer side costs are the costs of running the seller's workload under the existing CEEC or a new CEEC on the buyer side computing resource cohort(s). Again, these are not necessarily monetary costs but may be specified in terms of computing resource usage/reservation. These costs may be converted to monetary amounts, but this is not necessary to the operation of the illustrative embodiments.

The transaction specification provides the context and guidance for performing trades between buyers and sellers in the CEEC market such that CEECs may be migrated from sellers to buyers to achieve the overall purposes of the organization/enterprise. Thus, the transaction specification further represents a non-neutral CEEC market maker's introduction of market forces to cause the CEEC market to be directed to the achievement of the business purposes. The actual trading being performed is done with CEECs as the goods being traded. That is, a seller is a seller of a CEEC, or a portion of a CEEC, while a buyer is a buyer of a CEEC or portion of a CEEC.

The CEEC market maker mechanism 322 in FIG. 3 may be used to maximize the movement of CEECs and their associated computing workloads from less to more efficient vehicles, e.g., desktops to virtual servers, old technology laptop computers to newer server based services, or the like, to achieve optimization of an organization/enterprise in accordance with the stated purposes of the organization/enterprise as specified in the transaction specification. That is, the organization may be trying to optimize their use of real estate, optimize their use of power, optimize their use of administrative resources in a specific geography, etc.

By creating contractual instruments, i.e. the CEECs, to allow trading of these CEECs and their associated workloads, a mechanism is also provided to disaggregate and aggregate those same CEECs so that a given CEEC does not have to represent the entirety of a single system and its use. Simply put, with the CEECs and CEEC market maker services 322 of the illustrative embodiment, entitlements and their workloads do not have to migrate from System A to System B as a whole unit and thus, one does not have to have an agreement between the owner of System A and System B to perform the migration. To the contrary, with the CEEC mechanisms of the illustrative embodiments, one can split up System A's CEEC, and thus, its associated entitlements and corresponding workloads, into as many pieces as needed, and then find trades in which the individual pieces can be sold more readily than the entire contract (CEEC). That is, when CEECs are the basis for the trading, instead of workloads, an environment is created where each of these trading units (CEECs) can be separated and aggregated, disaggregated, bundled and re-bundled, all with the purpose of removing barriers to movement of the trading units (CEECs). Workloads cannot be aggregated, disaggregated, bundled and re-bundled without the introducing the possibility of corruption of the workload.

Thus, for example, with the CEECs and CEEC market maker services 322 of the illustrative embodiments, one can have more than two counterparties so that trading can happen amongst many different parties, obviating the need to find a single counter-party who wants to buy exactly and all of what the seller wants to sell or a seller that wants to sell exactly and all of what a buyer wants to buy. For example, counter-parties (buyers or sellers) can slice off just one element of the CEEC, e.g., just the storage terms because the buyer is a buyer of storage contracts (that is, it has available storage capacity) or just the administrative support terms of the CEEC because the buyer has administrative support resource capacity but no hardware capacity, or the like. Thus, by being able to disaggregate CEECs into constituent parts, the CEEC market maker services 322 are more likely to be able to pair buyers and sellers of a CEEC since the pool of buyers and sellers is increased. As a result, the business objectives specified in the transaction specification are more likely to be achieved via the CEEC market maker services 322.

Moreover, it should be appreciated that the "buyers" and "sellers" within the CEEC market are computing resource cohorts, not necessarily single systems. A buyer is a computing resource cohort that can acquire additional CEECs or portions of CEECs. A seller is a computing resource cohort that can relinquish CEECs or portions of CEECs to buyers. Thus, the essential function of the CEEC market making is not primarily bringing together one single seller with one single buyer, although this is possible with the mechanisms of the illustrative embodiments, e.g., one single seller of 1000 units and one single buyer of 1000 units. To the contrary, the CEEC market finds groups or cohorts of buyers and groups or cohorts of sellers which when combined want to sell 1000 and buy 1000 units, for example. The key point is that in a market in which one could only have a transaction between paired parties who both are obligated to buy/sell the exact same amount to each other, the number of transactions would be dramatically reduced and applying this to system optimization, opportunities to optimize the system are reduced. Thus, the mechanisms of the illustrative embodiments, which allow disaggregation of the units of trade, i.e. the CEECs, permit a larger number of transactions to be completed successfully via the CEEC market and thus increase the opportunities and likelihood of achieving an optimized and more efficient allocation and utilization of computing resources in an organization/enterprise.

With the CEEC market maker services 322 of the illustrative embodiments, a number of different types of trades in a number of different scenarios are made possible by defining the transaction specification appropriately and using the CEEC based mechanisms to determine buyers, sellers, and to pair one or more buyers with one or more sellers. For example, with the mechanisms of the illustrative embodiments, one type of trade may be to trade a CEEC from an underutilized or obsolete computing resource cohort to two different computing resource cohorts based on one computing resource cohort having a portion of required computing resources "on hand" while the other computing resource cohort comprises computing resources to be acquired by the organization or enterprise. In such a situation, the terms of the CEEC being sold may be split between the two computing resource cohorts, e.g., a storage capacity term of the CEEC may be split between storage capacity available in the first computing resource cohort and storage capacity that will become available on purchased hardware in the second computing resource cohort.

In another scenario, a CEEC for exclusive use of a computing resource can be nullified when the computing resource is not used sufficiently in the seller computing resource cohort. This nullified CEEC can be traded for a new CEEC whereby the non-utilized computing resource is shared with others, under contractually enumerated terms in the new CEEC. In this example, the workload does not move, rather it shares its existing capacity, and in so doing re-establishes a valid CEEC.

In yet another scenario, CEECs may be migrated from physical hardware computing resources to virtualized computing resources, e.g., from desktops to virtual machines (VMs). When migrating from physical devices to virtual devices, e.g., desktops to VMs, users' entitlements and workloads are migrating from a trivial massive local storage paradigm, to a storage paradigm in which storage is virtualized and more expensive per Gigabyte. With plentiful cheap unencumbered local storage in the physical device realm, users tend to fill up the local storage because they correctly assume that there is no extra cost for fully utilizing the local storage. This presents a migration challenge when moving to storage where each extra Gigabyte costs more significantly.

The illustrative embodiments provide a solution to this problem by allowing the splitting out of the storage component of the CEEC and "time-bombing" the storage component, so that "provided storage" shrinks by a fixed percentage each month after migration of the CEEC. Thus, for example, upon migration, the VM is allocated 200 Gigabytes of storage, with an explicit CEEC-based agreement that this allocation will be reduced by 25% each month until the allocation reaches 50 Gigs. Thus the user is obligated to eliminate unnecessary software and data (duplicate data, redundant backups, backlevel software, software not being used anymore, etc.) from the system in accordance with the contractual obligation. Such a CEEC would be entered into knowing that the user was capable of making such reductions, and with the understanding that identifying and eliminating 150 Gigs of unnecessary data will take some time.

Figure 12:
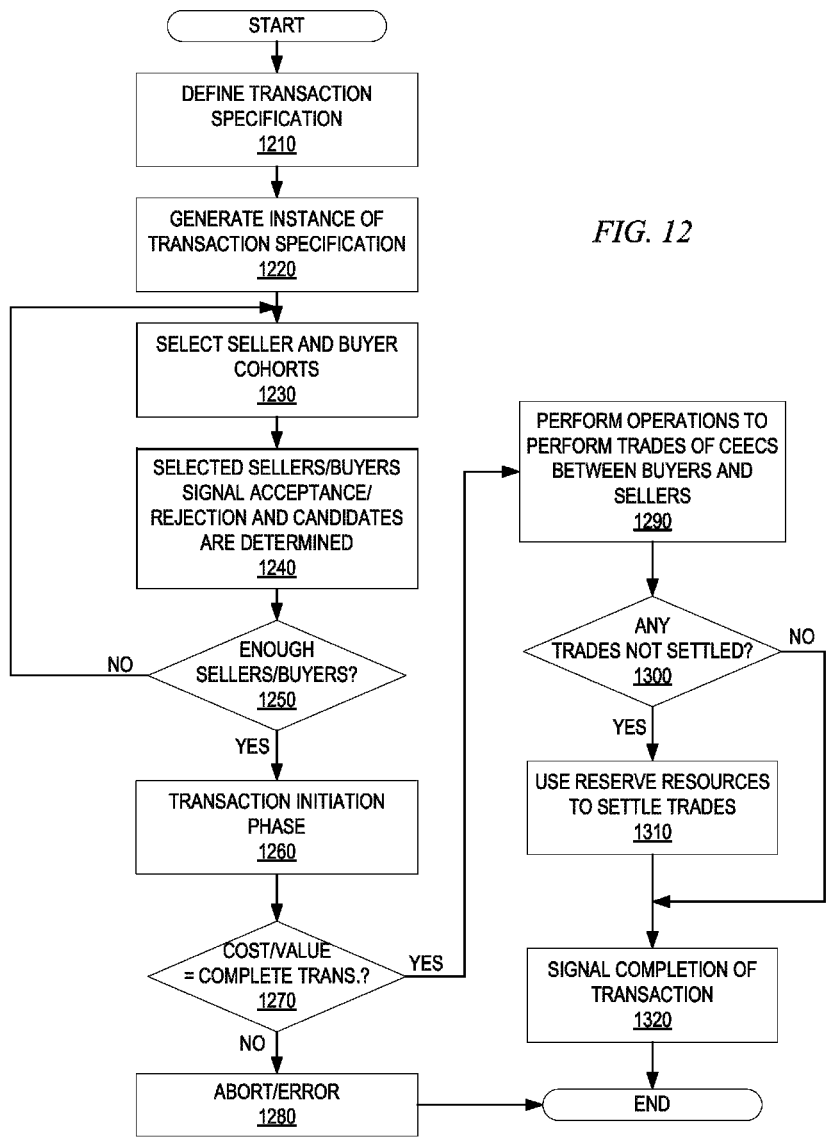
FIG. 12 is a flowchart outlining an example operation for performing a CEEC market transaction in accordance with one illustrative embodiment.

FIG. 12 is a flowchart outlining an example operation for performing a CEEC market transaction in accordance with one illustrative embodiment. The operation outlined in FIG. 12 may be performed, for example, using primarily the CEEC market maker services 322 in FIG. 3 with the transaction builder 312 providing an interface through which a transaction specification may be generated and submitted to the CEEC market maker services 322.

As shown in FIG. 12, the operation starts with receiving user input defining a transaction specification, or receiving a selection of an existing transaction specification, for use in performing one or more trades of a transaction (step 1210). An instance of the transaction specification is created based on the transaction specification (step 1220). Seller and buyer computing resource cohorts are selected in accordance with the criteria specified in the transaction specification (step 1230).

Selected sellers and buyers both signal acceptance or rejection of the transaction (step 1240). For those that signal acceptance, the selected sellers and buyers are "candidate" buyers and sellers and for those that signal rejection, they are removed from the selected potential sellers and buyers. A determination is made as to whether there are enough sellers and buyers to meet the objectives of the transaction (step 1250). If not, then the operation returns to step 1230 so that additional selections can be made until enough sellers and buyers are selected and agree to be candidates.

In response to there being enough sellers and buyers to meet the objectives of the transaction, then the initiation phase of the transaction is performed (step 1260). A determination is made as to whether the cost/value of the transaction indicates desirability to complete the transaction (step 1270). If not, the transaction is aborted (step 1280) and the operation terminates with an error. If so, then various operations are needed to perform the trades of CEECs between buyers and sellers to achieve the business purposes of the transaction are performed (step 1290). A determination is made as to whether any of the trades for completing the transaction were not able to be settled successfully (step 1300). If so, then reserve computing resources may be utilized to ensure successful settlement of these trades (step 1310). Thereafter, completion of the transaction is signaled to the CEEC market maker services (step 1320) and the operation terminates.

Thus, with the CEEC market maker services of the illustrative embodiments, mechanisms are provided, in a data processing system comprising at least one computing device and a plurality of computing resources, for monitoring a use of the computing resources relative to a computing environment entitlement contract (CEEC). These mechanisms may operate to establish, by the at least one computing device, one or more CEEC data structures, each CEEC data structure defining terms of a business level agreement between a contracting party and a provider of the data processing system. The terms of the CEEC specify a set of computing resources having a specified configuration that are to be used by the contracting party for a specified purpose at a specified level and pattern of intensity for a specified period of time. These mechanisms may further operate to associate, by the at least one computing device, the one or more CEEC data structures with a computing resource cohort, where the computing resource cohort is a collection of computing resources having similar configurations.

Moreover, these mechanisms may operate to identify, by the at least one computing device, a seller of a CEEC data structure, in the one or more CEEC data structures, where the seller is a computing resource that is not being utilized in accordance with the terms specified in the CEEC data structure. Furthermore, these mechanisms may operate to identify, by the at least one computing device, a buyer of a CEEC data structure, in the one or more CEEC data structures, where the buyer is a computing resource capable of satisfying the terms specified in the CEEC data structure.

The mechanisms may also operate to determine whether or not to migrate the CEEC data structure from the seller to the buyer based on the terms specified in the CEEC data structure. This determination may further be based on business objectives and other criteria specified in a transaction specification, for example. In response to a determination that the CEEC data structure is to be migrated from the seller to the buyer, the CEEC data structure may be migrated from the seller to the buyer. This migration may entail the nullification of the CEEC data structure associated with the seller and creation of a replacement CEEC data structure that is associated with the buyer, modification of the CEEC data structure so that it is no longer associated with the seller and is now associated with the buyer, e.g., updating an identifier of cohort association, or the like.

Thus, in the above mechanisms, the CEEC market maker services operate to select buyers and sellers in accordance with terms of the CEEC that is being migrated and terms of a transaction specification that defines the business objectives that need to be met by such migrations of CEECs. These mechanisms may operate in situations where buyers have expressed an interest in being buyers within the CEEC market, where sellers have expressed an interested in being sellers within the CEEC market, or where buyers and sellers are selected independent of any expressed interest in being buyers or sellers. Moreover, these mechanisms may operate to pair a single buyer with multiple sellers, a single seller with multiple buyers, or a plurality of buyers with a plurality of sellers. In order to facilitate such one-to-many, many-to-one, or many-to-many transactions, CEECs may be deaggregated with buyers being able to buy individual portions of a CEEC and sellers selling the portions of the CEECs to different buyers.

In other implementations, the illustrative embodiments allow computing resource cohorts to register as buyers and sellers with the CEEC market maker services and specify the criteria by which valid sellers/buyers may be selected by the CEEC market maker services. Such criteria may be used either exclusively, or in combination with the terms specified in a transaction specification, for example. The CEEC market maker services then operate to pair one or more buyers with one or more sellers in accordance with these terms specified in the registration as buyer/seller and the terms of the transaction specification. For example, in response to a CEEC compliance operation indicating that computing resources of a computing resource cohort associated with a CEEC are not being utilized in accordance with the terms of the CEEC by the contracting party, a registration notification may be sent to the CEEC market maker services 322 to add the computing resources cohort as a seller of the CEEC to the CEEC market and may specify terms for selection of a buyer, e.g., the buyer must provide sufficient resources and types of resources to satisfy the actual utilization measured for the contracting party and be able to provide a new CEEC matching these actual utilization measurements.

That is, the illustrative embodiments may provide mechanisms, in a data processing system comprising at least one computing device and a plurality of computing resources, for monitoring a use of the computing resources relative to a computing environment entitlement contract (CEEC). These mechanisms may establish one or more CEEC data structures, each CEEC data structure defining terms of a business level agreement between a contracting party and a provider of the data processing system. The terms of the CEEC specify a set of computing resources having a specified configuration that are to be used by the contracting party for a specified purpose at a specified level and pattern of intensity for a specified period of time. The mechanisms further operate to receive a first request from a provider system that provides one or more computing resources, requesting to be a buyer of a CEEC data structure, where the first request comprises first selection criteria for selecting a seller of the CEEC data structure.

In addition the mechanism of the illustrative embodiments may also operate to receive a second request from a seller system that owns a CEEC data structure, requesting to be a seller of the CEEC data structure. The second request may comprise second selection criteria for selecting a buyer for the CEEC data structure. The CEEC market maker services may then pair the provider system with the seller system based on the first and second selection criteria and may migrate the CEEC data structure from the seller system to the provider system. Workloads may then be executed on the provider system in accordance with the terms specified in the CEEC data structure. It should be appreciated that this migration may involve nullification and replacement of the original CEEC data structure with a new one having similar or different terms. Moreover, rather than having to migrate the entire CEEC, the CEEC data structure may represent only a portion of the CEEC.

Thus, with the mechanisms of the illustrative embodiments, facilities are provided for managing contracting parties entitlements to computing resources by encapsulating these entitlements in contractual mechanisms, i.e. the CEECs, which dictate a required level and pattern of utilization by the contracting party, for a specified business purpose, with the consequence of breach being nullification and potential replacement of the CEEC with a new CEEC on the same or different computing resources. The new CEEC may be tailored to correspond to a user's actual measured utilization rather than the level and pattern of utilization required by the original CEEC.

The illustrative embodiments further provide mechanisms for migrating such CEECs using a CEEC market with market forces being introduced that represent the business objectives of the organization or enterprise. This migration results in migration of workloads associated with the CEECs that are migrated since workloads are routed and contracting parties are now associated with the computing resource cohort(s) associated with the new or migrated CEEC. However, again, it should be kept in mind that the mechanisms of the illustrative embodiments differ significantly from known workload migration mechanisms.

For example, known workload migration mechanism are one-to-one migration mechanisms meaning that one system migrates an entire workload to one other system. The migration of CEECs using the mechanisms of the illustrative embodiments allow for the splitting of a CEEC into constituent parts such that each part may be migrated to a different target computing resource or computing resource cohort. Moreover, workload migration mechanisms are indifferent and non-judgmental about business purposes and uses, i.e. they do not determine whether computing resources are being used for specified business purposes, only whether migration of the workload would increase efficiency. Workload migration puts no obligation on the migrating computing resources to do anything in particular with the old system, whereas in many cases with the mechanism of the illustrative embodiments, the CEECs include specific obligations to decommission older systems, which if not done nullifies the CEEC, thus revoking the user's rights to use the system in its new home.

The mechanisms of the illustrative embodiments, as previously discussed, different from other types of workload based arrangements as well, such as Service Level Agreements, Quality of Service agreements, and the like. With such agreements, providers are not concerned with how a service is being used, or how much of it is being used, as long as the they are paid by the contracting party for the service level or quality of service that the provider is obligated to provide. With the CEEC based mechanisms of the illustrative embodiments, the CEECs ensure that the contracting party utilizes the associated computing resources in accordance with specified business purposes and in accordance with a level and pattern of utilization specified in the CEEC, otherwise nullification and/or migration of the CEEC is performed.

Furthermore, users in a SLA or QoS agreement do not care how the service is provided, i.e. what particular types of computing resources are used to provide the level of service or quality of service. However, with the CEEC based mechanisms of the illustrative embodiments the CEECs may specify requirements with regard to the types of computing resources that are to be provided under the CEEC and the CEEC market maker enforces such terms on behalf of the enterprise to ensure that the computing resources are provided in the most efficient possible way.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one computing device and a plurality of computing resources, for reserving computing resources of a data processing system, comprising:
    generating, by the at least one computing device, one or more computing environment entitlement contract (CEEC) data structures, each CEEC data structure defining terms of a business level agreement between a contracting party and a provider of computing resources of the data processing system, wherein the terms of the CEEC specify a set of computing resources having a specified configuration that are to be used by the contracting party for a specified purpose at a specified level and pattern of intensity for a specified period of time;
    associating, by the at least one computing device, a set of one or more computing resources with a CEEC data structure; and
    managing, by the at least one computing device, the set of one or more computing resources in accordance with the associated CEEC data structure, wherein, in response to the contracting party failing to utilize the set of one or more computing resources for the specified purpose at approximately the specified level and pattern of intensity during approximately the specified period of time specified in the CEEC data structure, logic of the at least one computing device nullifies the CEEC data structure;
    wherein the CEEC data structure comprises:
        a CEEC identifier field that specifies an identification of the CEEC;
        a contracting party identifier field that stores a contracting party identifier to uniquely identify a contracting party, or group of contracting parties, with which the CEEC data structure is associated;
        one or more computing resource identifier fields that uniquely identify the computing resource(s), computing resource cohorts, or other groups of computing resource(s) with which the CEEC data structure is associated;
        one or more business purpose fields that identify one or more specified business purposes for which the computing resource(s) identified in the one or more computing resource identifier fields may be used in accordance with the CEEC;
        one or more computing resource configuration fields that specify computing resource configuration requirements for satisfying the terms of the CEEC; and
        one or more utilization fields that specify a given level and pattern of intensity of utilization for a given period of time for which the contracting party is required to utilize the computing resources specified in one or more computing resource identifier fields.

2. The method of claim 1, wherein associating the set of one or more computing resources with a CEEC data structure comprises:
    determining a first set of one or more computing resource cohorts of computing resources based on configuration information for each of the computing resources, wherein computing resources within a computing resource cohort are of a similar type and have a similar configuration with each other;
    determining a second set of one or more CEEC cohorts of CEEC data structures based on attributes of one or more CEEC data structures maintained by the data processing system; and
    matching a selected CEEC cohort in the second set with a selected computing resource cohort in the first set based on terms of CEEC data structures in the selected CEEC cohort and characteristics of the selected computing resource cohort.

3. The method of claim 2, wherein the CEEC data structure is associated with more than one CEEC cohort based on individual terms of the CEEC data structure.

4. The method of claim 2, wherein managing the set of one or more computing resources in accordance with the associated CEEC data structure comprises routing workloads to computing resources in the set of one or more computing resources in accordance with terms specified in the associated CEEC data structure.

5. The method of claim 4, wherein routing workloads comprises:
    receiving a workload from a contracting party;
    retrieving one or more CEEC data structures associated with the contracting party;

determining a type of the workload;

determining a type of business purpose associated with the retrieved one or more CEEC data structures; and routing the workload to a computing resource specified in at least one of the retrieved one or more CEEC data structures based on the workload type and the determined type of business purpose.

6. The method of claim 5, wherein routing the workload to a computing resource specified in at least one of the retrieved one or more CEEC data structures based on the workload type and the determined type of business purpose comprising finding a computing resource in a computing resource cohort associated with a CEEC data structure having a type of business purpose matching the type of the workload.

7. The method of claim 1, wherein managing the set of one or more computing resources in accordance with the associated CEEC data structure comprises:

collecting resource utilization metric information from the one or more computing resources;

comparing the resource utilization metric information to the specified level and pattern of intensity of utilization specified in the associated CEEC data structure;

determining whether the collected resource utilization metric information is significantly different from the specified level and pattern of intensity of utilization specified in the associated CEEC data structure; and in response to the collected resource utilization metric information being significantly different from the specified level and pattern of intensity, modifying at least one of a membership of the CEEC data structure in a CEEC cohort or modifying an association of the CEEC data structure with the set of one or more computing resources.

8. The method of claim 7, wherein modifying at least one of a membership of the CEEC data structure or modifying an association of the CEEC data structure with the set of one or more computing resources comprises modifying a membership of the CEEC data structure by migrating the CEEC data structure whose specified level and pattern of intensity of utilization is significantly different from the collected resource utilization metric information to a different CEEC cohort.

9. The method of claim 7, wherein modifying at least one of a membership of the CEEC data structure or modifying an association of the CEEC data structure with the set of one or more computing resources comprises modifying an association of the CEEC data structure with the set of one or more computing resources by migrating the CEEC data structure from being associated with the set of one or more computing resources to being associated with a different set of one or more computing resources.

10. The method of claim 9, wherein migrating the CEEC to a different CEEC cohort comprises nullifying the CEEC whose specified level and pattern of intensity of utilization is significantly different from the collected resource utilization metric information and replacing the nullified CEEC with a new CEEC in the different CEEC cohort.

11. The method of claim 9, wherein migrating the CEEC from being associated with the set of one or more computing resources to being associated with a different set of one or more computing resources comprises nullifying the CEEC, creating a new CEEC, and associating the new CEEC with the different set of one or more computing resources.

12. The method of claim 1, wherein nullifying the CEEC data structure comprises revoking the contracting party's right to use the set of one or more computing resources under the terms of the CEEC.

* * * * *